US006678405B1

(12) United States Patent
Kondo et al.

(10) Patent No.: US 6,678,405 B1
(45) Date of Patent: Jan. 13, 2004

(54) DATA PROCESSING APPARATUS, DATA PROCESSING METHOD, LEARNING APPARATUS, LEARNING METHOD, AND MEDIUM

(75) Inventors: Tetsujiro Kondo, Tokyo (JP); Yoshinori Watanabe, Kanagawa (JP); Kazutaka Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 649 days.

(21) Appl. No.: 09/587,865

(22) Filed: Jun. 6, 2000

(30) Foreign Application Priority Data

Jun. 8, 1999 (JP) ............................................. 11-160528
Sep. 16, 1999 (JP) ............................................. 11-261706

(51) Int. Cl.$^7$ ................................................ G06K 9/62
(52) U.S. Cl. ........................ 382/159; 382/254; 382/156; 706/20; 706/21
(58) Field of Search ................................ 382/156, 157, 382/232, 236, 238, 239, 254, 261, 264, 274, 275, 300, 155, 159, 160, 272; 348/458, 459, 448; 358/447, 463; 708/201; 375/240.24, 254; 700/90, 43; 706/14, 20, 21, 25, 41, 43, 15, 1, 12, 13, 45, 46, 47, 52

(56) References Cited

U.S. PATENT DOCUMENTS 5,659,494 A    8/1997   Chmielewski et al.
5,946,044 A    8/1999   Kondo et al.
6,016,164 A  * 1/2000   Kawaguchi et al. ... 375/240.24

OTHER PUBLICATIONS

Patent Abstracts of Japan, vol. 1998, No. 01, Jan. 30, 1998 & JP 09 237345, Sep. 9, 1997.
Patent Abstracts of Japan, vol. 1997, No. 01, Jan. 31, 1997 & JP 08 235363, Sep. 13, 1996.

* cited by examiner

Primary Examiner—Bhavesh M. Mehta
Assistant Examiner—Ali Bayat
(74) Attorney, Agent, or Firm—Frommer Lawrence & Haug LLP; William S. Frommer

(57) ABSTRACT

A data processing apparatus includes a determining unit capable of determining, in accordance with a plurality of data to be extracted from said input data, irregular intervals among said plurality of data to be extracted from said input data, an extracting unit for extracting the plurality of data, which correspond to output data of interest to be predicted, from said input data in accordance with the determination result by said determining unit, and a predicting unit for finding predicted values of the output data of interest based on the plurality of data extracted by said extracting unit.

40 Claims, 26 Drawing Sheets

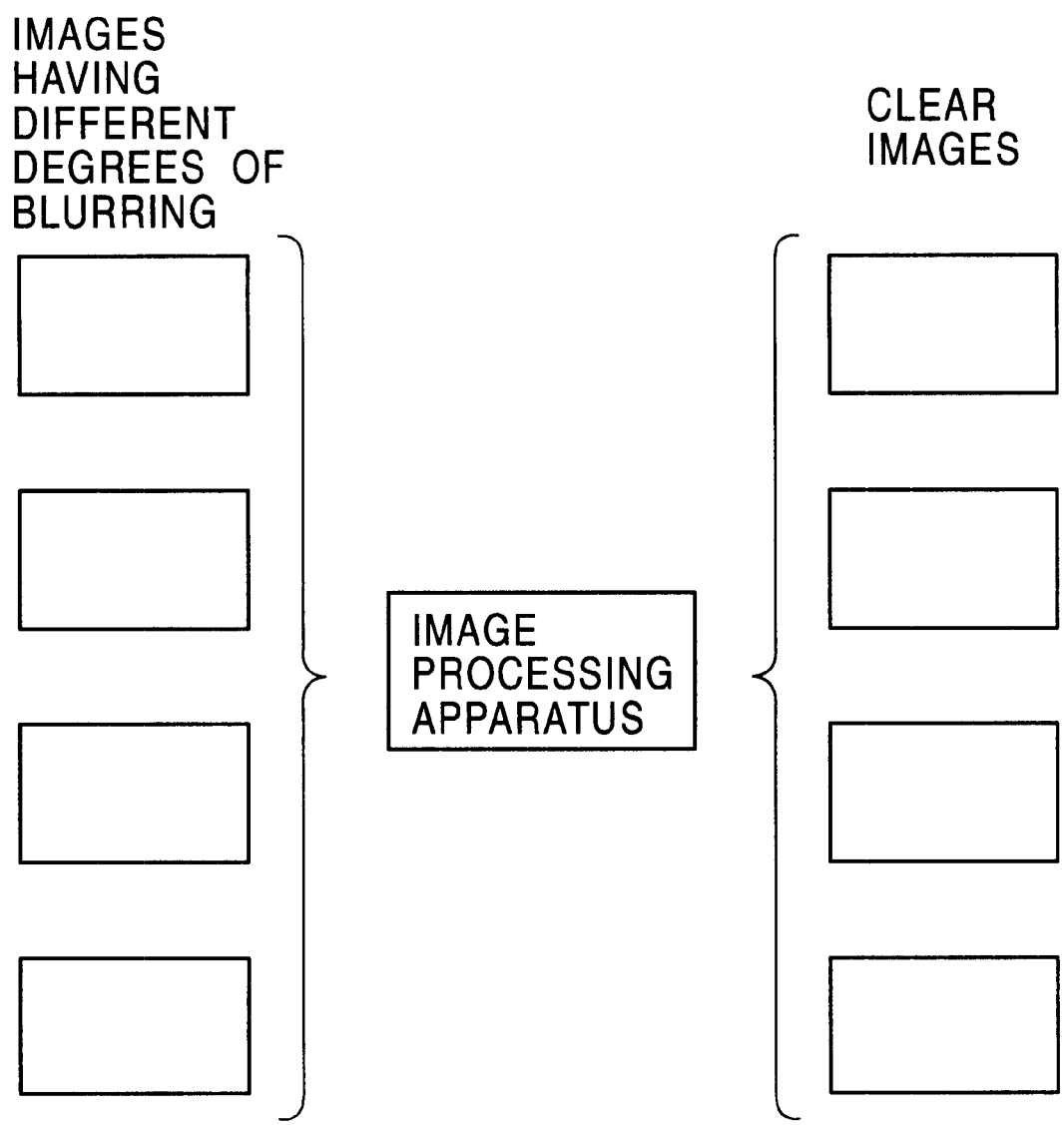

TAP WIDTH OF ZERO

CENTER PIXEL

TAP WIDTH OF ONE

CENTER PIXEL

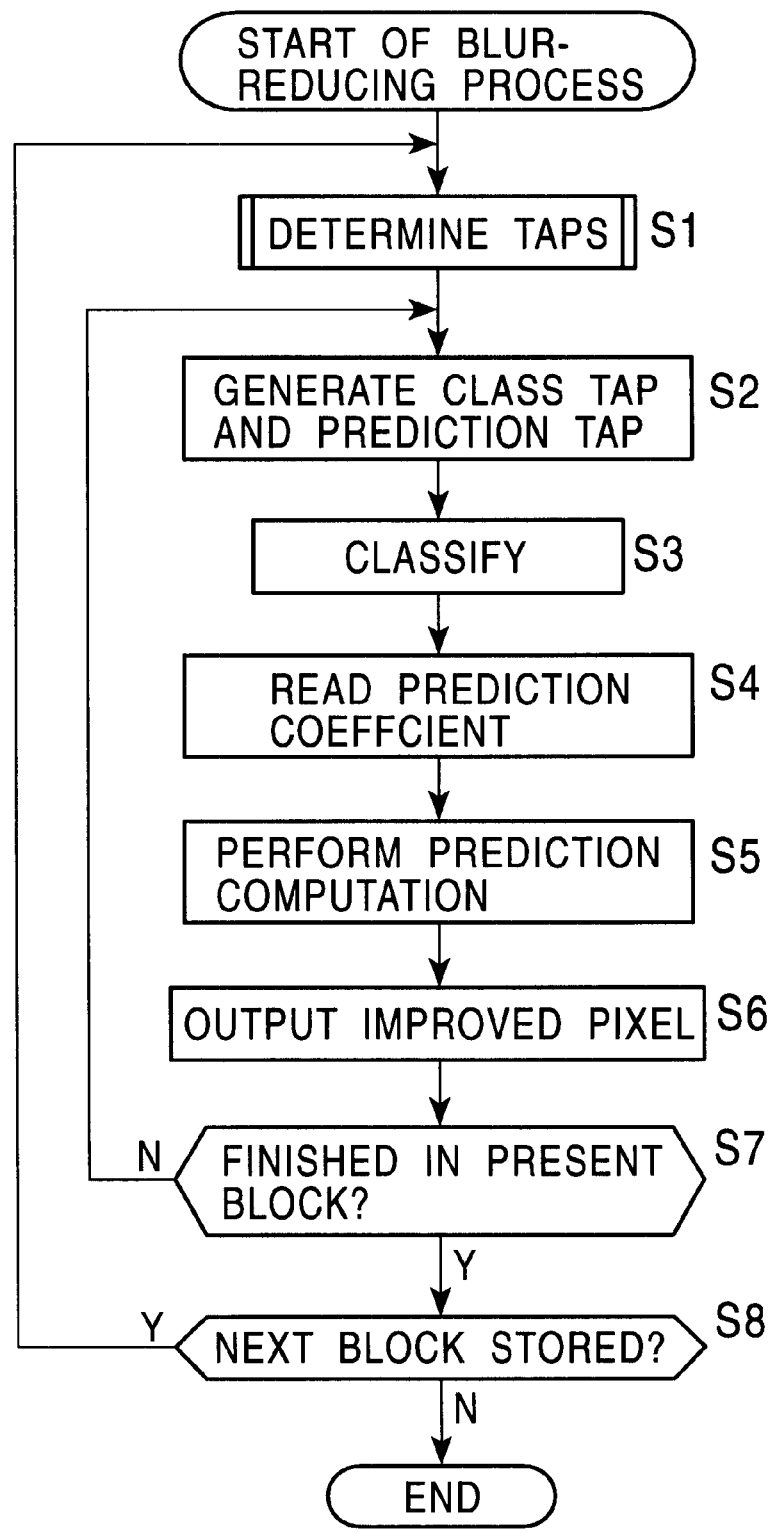

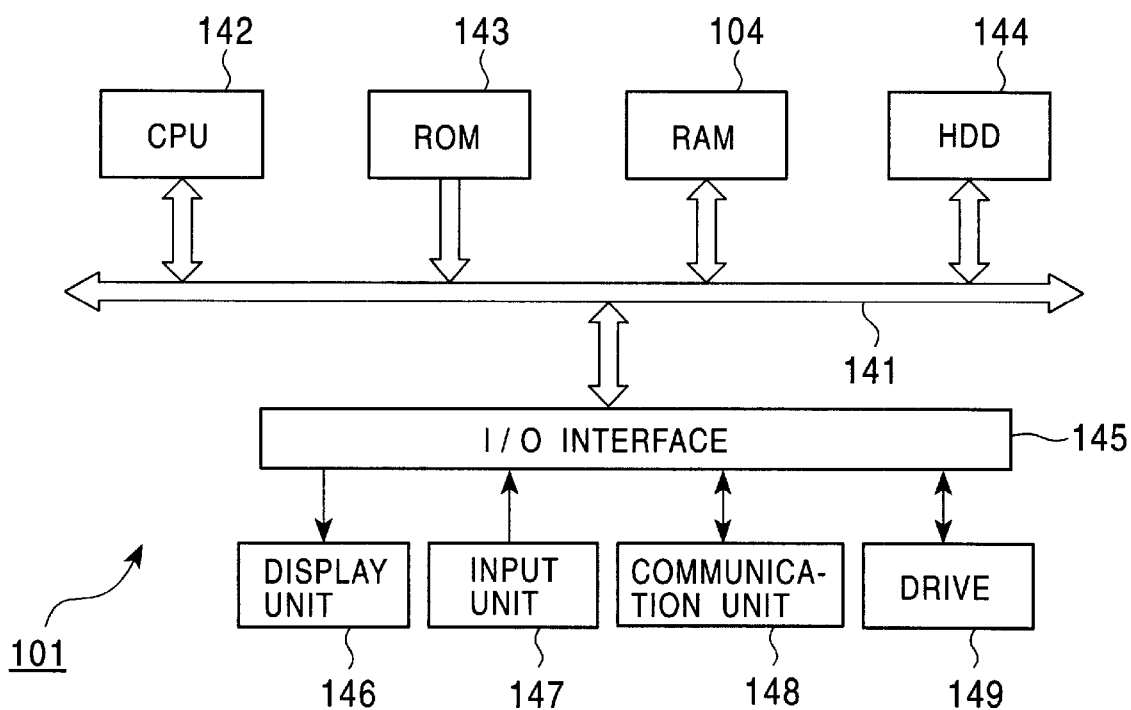

DATA PROCESSING APPARATUS, DATA PROCESSING METHOD, LEARNING APPARATUS, LEARNING METHOD, AND MEDIUM

BACKGROUND OF THE INVENTION

1. Field of the Invention

The present invention relates to data processing apparatuses and methods, learning apparatuses and methods, and media, and in particular, to a data processing apparatus and method for increasing processing efficiency when image data, etc., are processed, and to a medium provided with the same.

2. Description of the Related Art

The assignee of the present invention proposed classification adaptive processing as processing for increasing image quality, etc., and for improving other image features.

The classification adaptive processing consists of classifying processing and adaptive processing. In the classifying processing, data are classified based on their properties, and adaptive processing on the data in each class is performed. The adaptive processing is the following technique.

In the adaptive processing, by linearly linking, for example, pixels (hereinafter referred to as "input pixels") constituting an input image (an image to be processed by the classification adaptive processing) and predetermined prediction coefficients, predicted values of pixels of an original image (e.g., an image including no noise, an image free from blurring, etc.) are found, whereby an image in which noise included in the input image is eliminated, an image in which blurring generated in the input image is reduced, etc., can be obtained.

Accordingly, it is, for example, assumed that the original image is teacher data, and it is also assumed that an image obtained by superimposing noise on or blurring the original image is student data. The finding of predicted values E[y] of pixel levels y of pixels constituting the original image by using a linear first-order linking model defined by linear linking of a set of a plurality of student data (pixel levels) $x_1$, $x_2$, etc., and predetermined prediction coefficients $w_1$, $w_2$, etc., is considered. In this case, the predicted values E[y] can be represented by the following expression:

$$E[y]=w_1 x_1+w_2 x_2+ \ldots \quad (1)$$

For generalizing expression (1), by using the following expressions:

$$X = \begin{bmatrix} x_{11} & x_{12} & \ldots & x_{1n} \\ x_{21} & x_{22} & \ldots & x_{2n} \\ \ldots & \ldots & \ldots & \ldots \\ x_{m1} & x_{m2} & \ldots & x_{mn} \end{bmatrix}$$

$$W = \begin{bmatrix} w_1 \\ w_2 \\ \ldots \\ w_n \end{bmatrix}, Y' = \begin{bmatrix} E[y_1] \\ E[y_2] \\ \ldots \\ E[y_m] \end{bmatrix}$$

to define a matrix W composed of a set of prediction coefficients w, a matrix X composed of a set of student data, and a matrix Y' composed of a set of predicted values E[y], the following observation equation holds:

$$XW=Y' \quad (2)$$

Here, a component $x_{ij}$ of the matrix X represents the j-th student data in an i-th set of student data (a set of student data for use in prediction of the i-th teacher data $y_i$), and a component $w_j$ of the matrix W represents a prediction coefficient in which the product of the coefficient and the j-th student data in the set of student data is calculated. A component $y_j$ represents the j-th teacher data, and $E[y_j]$ accordingly represents a predicted value of the j-th teacher data.

The finding of each predicted value E[y] close to each pixel level y of the original pixel by applying a least square operation to the observation equation (2) is considered. In this case, by using the following expressions:

$$E = \begin{bmatrix} e_1 \\ e_2 \\ \ldots \\ e_m \end{bmatrix}, \text{and } Y = \begin{bmatrix} y_1 \\ y_2 \\ \ldots \\ y_m \end{bmatrix}$$

to define a matrix Y composed of a set of actual pixel levels y of the original pixels which are used as teacher data, and a matrix E composed of a set of residuals e of predicted values E[y] from the pixel levels y of the original pixels, the following residual equation holds from expression (2):

$$XW=Y+E \quad (3)$$

In this case, the prediction coefficients w for the predicted values E[y] close to the pixel levels of the original pixels can be found by minimizing the following squared error:

$$\sum_{i=1}^{m} e_i^2$$

Therefore, when the result of differentiating the squared errors with respect to the prediction coefficient $w_i$ is zero, the prediction coefficient $w_i$, which satisfies the following expression, is an optimal value for finding the predicted values E[y] close to the pixel levels y of the original pixels.

$$e_1 \frac{\partial e_1}{\partial w_i} + e_2 \frac{\partial e_2}{\partial w_i} + \ldots + e_m \frac{\partial e_m}{\partial w_i} = 0 (i = 1, 2, \ldots, n) \quad (4)$$

Accordingly, by using the prediction coefficient $w_i$ to differentiate expression (3), the following expressions hold:

$$\frac{\partial e_i}{\partial w_1} = x_{i1}, \frac{\partial e_i}{\partial w_2} = x_{i2}, \ldots, \frac{\partial e_i}{\partial w_n} = x_{in} (i = 1, 2, \ldots, m) \quad (5)$$

From expressions (4) and (5), the following expressions are obtained:

$$\sum_{i=1}^{m} e_i x_{i1} = 0, \sum_{i=1}^{m} e_i x_{i2} = 0, \ldots, \sum_{i=1}^{m} e_i x_{in} = 0 \quad (6)$$

When relationships among the student data x, the prediction coefficients w, the teacher data y, and the residuals e, are taken into consideration, the following normalization equations can be obtained from expression (6).

$$\left\{\begin{array}{l}\left(\sum_{i=1}^{m}x_{i1}x_{i1}\right)w_1+\left(\sum_{i=1}^{m}x_{i1}x_{i2}\right)w_2+\ldots+\left(\sum_{i=1}^{m}x_{i1}x_{in}\right)w_n=\left(\sum_{i=1}^{m}x_{i1}y_i\right)\\ \left(\sum_{i=1}^{m}x_{i2}x_{i1}\right)w_1+\left(\sum_{i=1}^{m}x_{i2}x_{i2}\right)w_2+\ldots+\left(\sum_{i=1}^{m}x_{i2}x_{in}\right)w_n=\left(\sum_{i=1}^{m}x_{i2}y_i\right)\\ \left(\sum_{i=1}^{m}x_{in}x_{i1}\right)w_1+\left(\sum_{i=1}^{m}x_{in}x_{i2}\right)w_2+\ldots+\left(\sum_{i=1}^{m}x_{in}x_{in}\right)w_n=\left(\sum_{i=1}^{m}x_{in}y_i\right)\end{array}\right\} \quad (7)$$

By preparing a certain number of student data x and a certain number of teacher data y, the normalization equations (7) can be formed corresponding to the number of prediction coefficients w. Accordingly, by solving equations (7) (although the solution of equations (7) requires a matrix composed of coefficients on the prediction coefficients w to be regular), the optimal prediction coefficients w can be found. For solving equations (7), Gauss-Jordan elimination, or the like, may be used.

The adaptive processing is the above-described processing in which the predicted values E[y] close to the pixel levels y of the original pixels are found based on expression (1), using the prediction coefficients w found beforehand.

The adaptive processing differs from, for example, simple interpolation in that components which are not included in an input image but which are included in the original image are reproduced. In other words, as long as attention is paid to only expression (1), the adaptive processing is the same as interpolation using a so-called interpolating filter. However, in the adaptive processing, the prediction coefficients w corresponding to tap coefficients of the interpolating filter are obtained by a type of learning using the teacher data y for each class. Thus, components included in the original image can be reproduced. That is, an image having a high signal-to-noise ratio can be easily obtained. From this feature, it may be said that the adaptive processing has an image creating (resolution creating) operation. Therefore, in addition to the case where predicted values of an image obtained by eliminating noise and blurring in the original image are found, the adaptive processing may be used for, for example, the conversion of an image having a low or standard resolution into an image having a high resolution.

As described above, in the classification adaptive processing, the adaptive processing is performed for each class. In classification performed before the adaptive processing, a plurality of input pixels are extracted which are adjacent to each of original pixels (hereinafter referred to also as "original pixels of interest") based on which a predicted value is found, and the original pixels of interest are classified based on the characteristics of the input pixels (e.g., patterns of the input pixels, an inclination of the pixel levels, etc.). Input pixels fixedly positioned with respect to the original pixels of interest are extracted as the plurality of input pixels for the classification.

Nevertheless, in cases where the classification adaptive processing is used to convert, for example, a blurred input image into a blur-reduced image, the use of input pixels fixedly positioned to original pixels of interest to classify the original pixels of interest regardless of the degree of the blurring in the input image may make it difficult to perform classification that sufficiently reflects the characteristics of the original pixels of interest.

By way of example, when classification adaptive processing on an input image having a small degree of blurring is performed, by preferably performing, in an aspect of image correlation, classification using input pixels relatively close to the original pixels of interest, classification that reflects the characteristics of the original pixels of interest can be performed. When classification adaptive processing on an input image having a large degree of blurring is performed, by preferably performing, in an aspect of adverse effects of the blurring, classification using input pixels relatively far from the original pixels of interest, classification that reflects the characteristics of the original pixels of interest can be performed.

Accordingly, the use of the input pixels fixedly positioned to the original pixels of interest for classification of the original pixels of interest may hinder classification of the original pixels of interest, which reflects their characteristics. As a result, the performance of the classification adaptive processing may deteriorate, that is, an image (here an image obtained by sufficiently reducing blur) obtained by using the classification to sufficiently improve the input image may not be obtained.

In the adaptive processing, input pixels fixedly positioned to pixels of interest are used to perform computation based on the linear prediction expressions (1), whereby predicted values based on pixels of interest are found. Also in this case, it is expected, similarly to the case of the classification, that, by preferably performing computation based on the linear prediction expressions (1) with input pixels variably positioned to the pixels of interest, as required, predicted values having small prediction errors from the pixels of interest can be found.

SUMMARY OF THE INVENTION

Accordingly, it is an object of the present invention to provide a data processing apparatus and method that solves the foregoing problems, thereby increasing processing efficiency when image data, etc., are processed, and a medium provided with the same To this end, according to an aspect of the present invention, the foregoing object is achieved through provision of a data processing apparatus for predicting output data corresponding to input data by processing the input data. The data processing apparatus includes a determining unit capable of determining, in accordance with a plurality of data to be extracted from the input data, irregular intervals among the plurality of data to be extracted from the input data, an extracting unit for extracting the plurality of data corresponding to output data of interest to be predicted from the input data in accordance with the determination result by the determining unit, and a predicting unit for finding predicted values of the output data of interest based on the plurality of data extracted by the extracting unit.

According to another aspect of the present invention, the foregoing object is achieved through provision of a learning apparatus for predicting output data corresponding to input data by processing the input data. The learning apparatus includes a determining unit capable of determining, in accordance with a plurality of data to be extracted from the input data, irregular intervals among the plurality of data to be extracted from the input data, and an extracting unit for extracting the plurality of data corresponding to output data of interest to be predicted from the input data in accordance with the determination result, and a computing unit for finding prediction coefficients based on the extracted data.

According to a further aspect of the present invention, the foregoing object is achieved through provision of a data processing method for predicting output data corresponding to input data by processing the input data. The data processing method includes the steps of enabling determination of irregular intervals among a plurality of data to be extracted from the input data in accordance with the plurality of data to be extracted, extracting the plurality of data corresponding to output data of interest to be predicted from the input data in accordance with the determination result, and finding predicted values of the output data of interest based on the extracted plurality of data.

According to a still further aspect of the present invention, the foregoing object is achieved through provision of a learning method for predicting output data corresponding to input data by processing the input data. The learning method includes the steps of enabling determination of irregular intervals among a plurality of data to be extracted from the input data in accordance with the plurality of data to be extracted, extracting the plurality of data corresponding to output data of interest to be predicted from the input data in accordance with the determination result, and finding prediction coefficients based on the extracted plurality of data.

According to yet another aspect of the present invention, the foregoing object is achieved through provision of a storage medium containing a computer-controllable program for predicting output data corresponding to input data by processing the input data. The computer-controllable program includes the steps of enabling determination of irregular intervals among a plurality of data to be extracted from the input data in accordance with the plurality of data to be extracted, extracting the plurality of data corresponding to output data of interest to be predicted from the input data in accordance with the determination result, and finding predicted values of the output data of interest based on the extracted plurality of data.

According to yet another aspect of the present invention, the foregoing object is achieved through provision of a storage medium containing a computer-controllable program for predicting output data corresponding to input data by processing the input data. The computer-controllable program includes the steps of enabling determination of irregular intervals among a plurality of data to be extracted from the input data in accordance with the plurality of data to be extracted, extracting the plurality of data corresponding to output data of interest to be predicted from the input data in accordance with the determination result, and finding prediction coefficients based on the extracted plurality of data.

BRIEF DESCRIPTION OF THE DRAWINGS

FIG. 2 is an illustration of processing by the image processing apparatus shown in FIG. 1;

FIG. 4 is a flowchart illustrating a blur-reducing process by the image processing apparatus shown in FIG. 1;

FIG. 26 is a block diagram showing an example of a computer into which a program for executing processing according to the present invention is installed.

DESCRIPTION OF THE PREFERRED EMBODIMENTS

Figure 1:
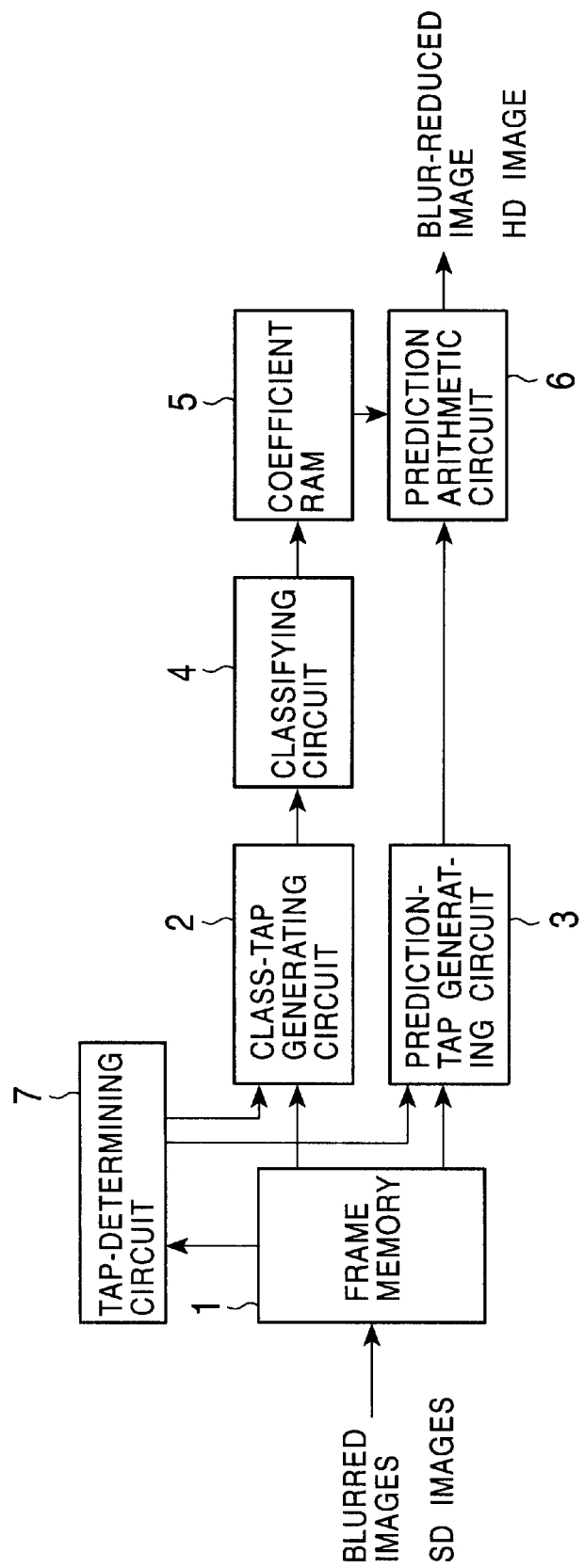
FIG. 1 is a block diagram showing an image processing apparatus according to an embodiment of the present invention.

FIG. 1 shows a first embodiment of an image processing apparatus to which the present invention is applied.

When, for example, blurred images are input as input images to the image processing apparatus, the image processing apparatus can perform classification adaptive processing on the input images, thereby outputting images (blur-reduced image) in which the blurring is sufficiently reduced regardless of the degree of blurring in the input images, as shown in FIG. 2.

The image processing apparatus includes a frame memory 1, class-tap generating circuit 2, a prediction-tap generating circuit 3, a classifying circuit 4, a coefficient random access memory (RAM) 5, a prediction arithmetic circuit 6, and a tap-determining circuit 7. Input images to be processed for reducing blurring are input to the image processing apparatus.

The frame memory 1 temporarily stores the image input to the image processing apparatus in, for example, units of frames. In the first embodiment, the frame memory 1 can store input images as a plurality of frames by bank switching. The frame memory 1 can perform a process of temporarily storing images input to the image processing apparatus in units of frames, even if the input images are moving pictures.

Using original pixels (ideal blurless pixels obtained by completely eliminating blurring in input pixels in the first embodiment) based on which predicted values are found by classification adaptive processing, as original pixels of interest, the class-tap generating circuit 2 extracts input pixels for classification of the original pixels of interest from the input images stored in the frame memory 1 in accordance with tap information supplied from the tap-determining circuit 7, and outputs the extracted pixels as class taps to the classifying circuit 4.

The prediction-tap generating circuit 3 extracts the input pixels for finding, by the prediction arithmetic circuit 6, predicted values based on the original pixels of interest in accordance with the tap information from the tap-determining circuit 7, and supplies the extracted pixels as prediction taps to the prediction arithmetic circuit 6.

The classifying circuit 4 classifies the original pixels of interest based on the class taps from the class-tap generating circuit 2, and supplies class codes corresponding to classes obtained by the classification, as addresses, to the coefficient RAM 5. In other words, the classifying circuit 4 performs, for example, 1-bit adaptive dynamic range coding (ADRC) on the class taps from the class-tap generating circuit 2, and outputs the obtained ADRC codes as class codes to the coefficient RAM 5.

Here, in k-bit ADRC, from among the input pixels constituting the class taps, the maximum value MAX and the minimum value MIN are detected, a value DR=MAX−MIN is used as a dynamic range, and based on the dynamic range DR, the input pixels constituting the class taps are requantized to have k bits. In other words, from the pixel levels of the pixels constituting the class taps, the minimum value MIN is subtracted, and the obtained values are divided by $DR/2^k$ (quantized). Accordingly, when the class taps are processed by 1-bit ADRC, the pixel level of each of the input pixels has one bit. In this case, a string of bits obtained by arranging 1-bit pixel levels based on the pixels constituting the class taps in predetermined order, as described above, is output as an ADRC code.

The coefficient RAM 5 stores prediction coefficients for classes, which are obtained such that a learning apparatus (described below) performs learning. When being supplied with a class code from the classifying circuit 4, the coefficient RAM 5 reads prediction coefficients stored at an address corresponding to the class code, and supplies the code to the prediction arithmetic circuit 6.

The prediction arithmetic circuit 6 finds the predicted values E[y] based on the original pixels y of interest by performing computation based on expression (1) with the prediction coefficients w1, w2, etc., supplied from the coefficient RAM 5, and the pixel levels x1, x2, etc., supplied from the prediction-tap generating circuit 3, which constitutes the prediction taps. The prediction arithmetic circuit 5 outputs the predicted values E[y] as the pixel levels of pixels in which blurring is eliminated.

The tap-determining circuit 7 determines, based on a statistic stored in the frame memory 1, a plurality of input pixels constituting class taps and prediction taps, and supplies information (hereinafter referred to also as "tap information") about the class taps and the prediction taps to the class-tap generating circuit 2 and the prediction-tap generating circuit 3.

In other words, the tap-determining circuit 7 outputs the tap information, which basically controls the class-tap generating circuit 2 and the prediction-tap generating circuit 3 to generate square class taps and prediction taps (hereinafter both referred to simply as "taps") each composed of, for example, three horizontal pixels and three vertical pixels in which an input pixel positioned corresponding to an original pixel of interest is used as a center pixel. The tap information controls the interval between pixels constituting the tap to differ depending on the statistical value of the input images.

Figure 3A:
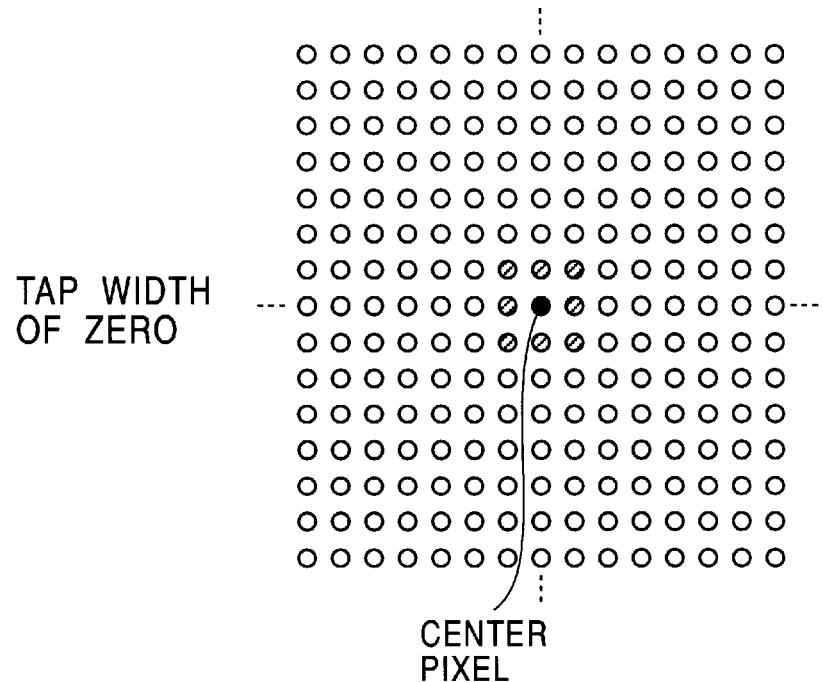
FIG. 3A is an illustration of a tap composed of 3×3 pixels, output from the tap-determining circuit 7 shown in FIG. 1, which has a tap width of zero.
Figure 3B:
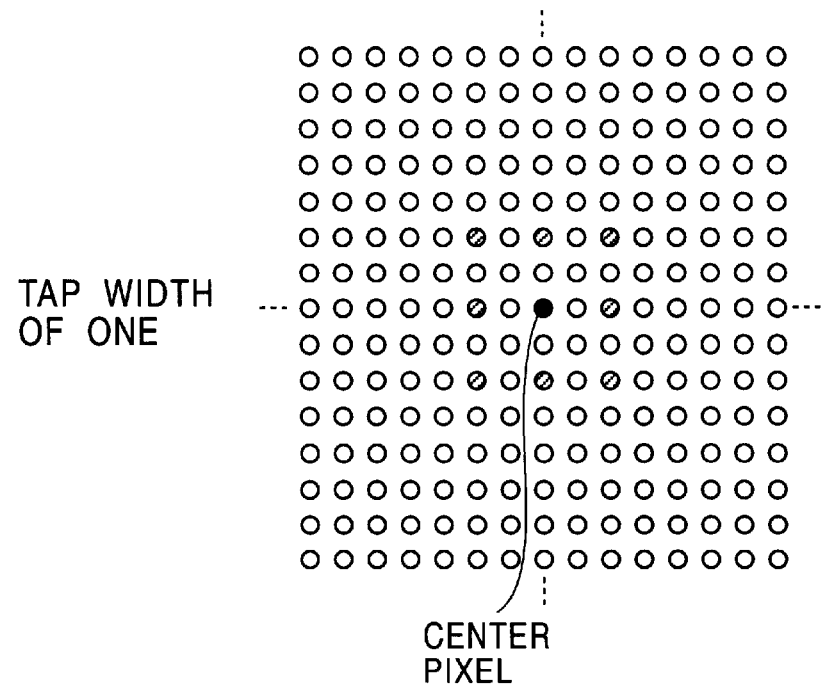
FIG. 3B is an illustration of a tap composed of 3×3 pixels, output from the tap-determining circuit 7 shown in FIG. 1, which has a tap width of one.

Specifically, when the statistical value of the input images is, for example, a certain value, the tap-determining circuit 7 outputs tap information for generating a tap which is composed of 3×3 pixels around a center pixel and which has a tap width of zero (the interval between pixels constituting a tap is zero), as shown in FIG. 3A. When the statistical value of the input images is, for example, another value, the tap-determining circuit 7 outputs tap information for generating a tap which is composed of 3×3 pixels around a center pixel and which has a tap width of one (the interval between pixels constituting a tap is one pixel or one frame), as shown in FIG. 3B.

Referring to the flowchart shown in FIG. 4, a process for reducing blurring in the input images, which is performed in the image processing apparatus shown in FIG. 1, is described below.

Input images (moving picture) to be processed so that blurring-reduction is performed are supplied to the frame memory 1 in units of frames. The input images are sequentially stored in units of frames in the frame memory 1.

In step S1, the tap-determining circuit 7 determines, based on the statistical value of the input images stored in the frame memory 1, a plurality of input images for generating taps, and outputs tap information about the input images to the class-tap generating circuit 2 and the prediction-tap generating circuit 3.

When receiving the tap information, in step S2, in accordance with the tap information, the class-tap generating circuit 2 and the prediction-tap generating circuit 3 each read, from the frame memory 1, a plurality of input images for generating a class tap and a prediction tap for each original pixel of interest based on which a predicted value is found, and generates the class tap and the prediction tap. The class tap and the prediction tap are supplied to the classifying circuit 4 and the prediction arithmetic circuit 6, respectively.

When receiving the class tap from the class-tap generating circuit 2, in step S3, the classifying circuit 4 classifies the original pixels of interest based on the received class tap. The classifying circuit 4 outputs obtained class codes as addresses to the coefficient RAM 5. In step S4, the coefficient RAM 5 reads a prediction coefficient stored at an address corresponding to the class code from the classifying circuit 4, and supplies the prediction coefficient to the prediction arithmetic circuit 6.

In step S5, the prediction arithmetic circuit 6 uses both the prediction tap from the prediction-tap generating circuit .3 and the prediction coefficient from the .coefficient RAM 5 to perform computation based on expression. (1), thereby finding the predicted value E[y] based on the original pixel y of interest. In other words, a blurring-reduced pixel is found, and the process proceeds to step S6. In step S6, the prediction arithmetic-circuit 6 outputs the predicted value E[y] based on the original pixel y of interest obtained in step S5 as a pixel level in which blurring is reduced at an input pixel having the same position as the original pixel y of interest. The process proceeds to step S7.

In step S7, a controller or the like determines whether the above-described processing on all original pixels of interest in a predetermined block (described below) has been performed. If the controller has determined negatively, the process proceeds back to step S2. In step S2, among the original pixels in the block, those unused as original pixels of interest are used as further original pixels of interest, and the same processing is subsequently performed. Accordingly, in the first embodiment, for original pixels of interest in the same block, a tap is generated based on the same tap information. In other words, for the original pixels of interest in the same block, a tap is generated from input pixels identically positioned with respect to each original pixel of interest.

If the controller has determined in step S7 that the process has been performed using all the original pixels in the predetermined block as original pixels of interest, the process proceeds to step S8. In step S8, the controller or the like determines whether there is a block to be subsequently processed, in other words, whether an input image corresponding to the block to be subsequently processed is stored the frame memory 1. If the controller has determined in step S8 that the input image corresponding to the block to be subsequently processed is stored in the frame memory 1, the process returns to step S1, and similar processing is subsequently performed. Accordingly, new tap information is determined for the block to be subsequently processed, and a tap is generated in accordance with the tap information.

If the controller or the like has determined in step S8 that the input image corresponding to the block to be subsequently processed is stored in the frame memory 1, the process is terminated.

Figure 5:
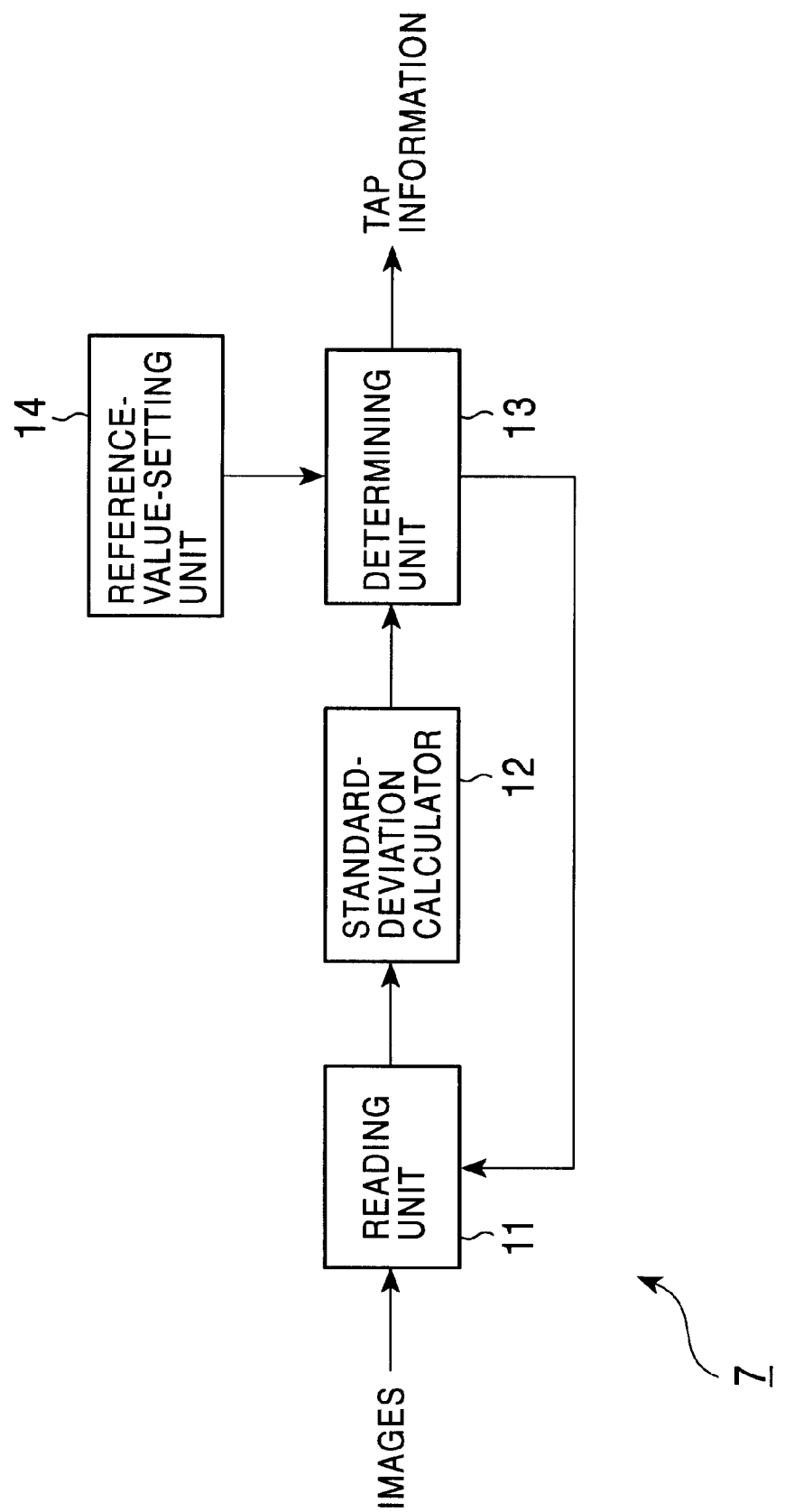
FIG. 5 is a block diagram showing the tap-determining circuit 7 shown in FIG. 1.

Referring to FIG. 5, an example of the tap-determining circuit 7 shown in FIG. 1 is described below.

A reading unit 11 reads, when an original pixel in the predetermined block is used as an original pixel of interest, input pixels to be used as a tap based on the original pixel of interest from the frame memory 1 (shown in FIG. 1), and supplies the pixels to a standard-deviation calculator 12.

In the reading unit 11, one frame of an original image, regions obtained by dividing the one frame, or several frames (e.g., a frame just after change of scenes to a frame just before the next change of scenes) are used as one block, and tap information is determined in the block unit. When each original pixel in a block is used as an original pixel of interest, the reading unit 11 reads, for each original pixel, input pixels constituting a tap having a tap width in accordance with control by a determining unit 13 from the frame memory 1, and supplies the pixels to the standard-deviation calculator 12.

The standard-deviation calculator 12 calculates, as a statistical value of the tap from the reading unit 11, a standard deviation (accurately a value equivalent to the standard deviation) of the pixel levels of the input pixels constituting the tap. The standard-deviation calculator 12 calculates an average score of standard deviations of taps having the same tap width, and supplies the determining unit 13 with the average score as a value of evaluating each tap width for each block. When a block is represented by i, and a tap width is represented by j, the standard-deviation calculator 12 calculates score(i,j) represented by the following expression as a value of evaluating a tap width j, and the score(i,j) to the determining unit 13.

$$\text{score}(i, j) = \frac{1}{M} \sum_{m=1}^{M} \sqrt{\sum_{k=1}^{K} (V_{m,j,k} - \text{mean}_{m,j})^2} \qquad (8)$$

where M represents the number of original pixels in a block #i, K represents the number of input pixels constituting a tap, $V_{m,j,k}$ represents the pixel level of the k-th input pixel in a tap having a tap width j, which corresponds to the m-th original pixel in a block #i, and $\text{mean}_{m,j}$ represents an average value of taps having the tap width j, which corresponds to the m-th pixel in the block #1. Therefore, $\text{mean}_{m,j}$ can be found by performing an operation of $(V_{m,j,1} + V_{m,j,2} + \ldots + V_{m,j,k})/k$.

The determining unit 13 compares the evaluated value score(i,j) from the standard-deviation calculator 12 and a predetermined reference value set in a reference-value setting unit 14, and controls the reading unit 11 based on the comparison result. Based on the comparison result, the determining unit 13 determines a tap width used when a tap is generated for original pixels in the block (hereinafter referred to also as the "block of interest") including the original pixels of interest, and outputs the tap width as tap information.

In the reference-value setting unit 14, a standard deviation of pixel levels of input pixels (student data) constituting a tap in the case where blurring in the input images is most reduced (in the case where the result of classifying input pixels is closest to original pixels corresponding to the input pixels) is set as a reference value for comparing two outputs from the standard-deviation calculator 12. The way of finding the reference value is described later.

Referring to the flowchart shown in FIG. 6, a tap determining process is below described in which the tap-determining circuit 7 shown in FIG. 5 determines tap structure.

In the tap determining process, when any one of the original pixels in the block of interest is initially used as an original pixel of interest, in step S11, from the frame memory 1 (shown in FIG. 1), the reading unit 11 reads, for the original pixel used as an original pixel of interest in the block of interest, for example, input pixels for generating taps having a tap width of zero, and supplies the taps to the standard-deviation calculator 12.

The process proceeds to step S12. In step S12, the standard-deviation calculator 12 calculates a standard deviation of the taps composed of the input pixels, and the process proceeds to step S13. In step S13, the controller or the like determines whether the above-described processing on all pixels in the block of interest has been performed. If the controller or the like has determined negatively, the process returns to step S11. From among the original pixels in the block of interest, those that have not been used are used as further original pixels of interest, and similar processing is repeatedly performed.

If the controller or the like has determined in step S13 that the above-described processing on all the original pixels in the block of interest has been performed, the process proceeds to step S14. In step S14, the standard-deviation calculator 12 calculates the average of the obtained tap standard deviations for the original pixels in the block of interest.

In other words, when the block of interest is represented by block #i, and the tap width of a tap generated for each original pixel in the block #i of interest is represented by j, the score(i,j) represented by expression (8) is calculated in step S14. The score(i,j) is supplied to the determining unit 13.

In step S15, the determining unit 13 determines whether the score(i,j) from the standard-deviation calculator 12 is close to the reference value set in the reference-value setting unit 14. If the determining unit 13 has determined negatively, i.e., when the average of standard deviations of taps having a tap width j, which are generated for original pixels in the block of interest #1, is not close to the reference value, the process proceeds to step S16. In step S16, the determining unit 13 controls the reading unit 11 to change the tap width j, and the process proceeds back to step S11.

In this case, in step S11, the reading unit 11 uses a certain original pixel in a block of interest as an original pixel of interest, and reads, for the original pixel of interest, input pixels for generating taps having a tap width j+1 from the frame memory 1. Subsequently, similar processing is performed.

When, in step S15, the determining unit 13 determines that the score(i,j) from the standard-deviation calculator 12 is close to the reference value set in the reference-value setting unit 14, that is, when the average of standard deviations of taps (having the tap width j) generated for the original pixels of the block #1 of interest is close to the reference value, the process proceeds to step S17. In step S17, the determining unit 13 outputs the tap width j as tap information, and the process returns.

As described above, in accordance with tap information for each block, which is output by the tap-determining circuit 7, the class-tap generating circuit 2 and the prediction-tap generating circuit 3 generate taps in which original pixels in each block are used as original pixels of interest. When the tap-determining circuit 7 outputs tap information based on the tap width j, taps having the tap width j output as the tap information are generated for the original pixels constituting the block of interest.

Figure 7:
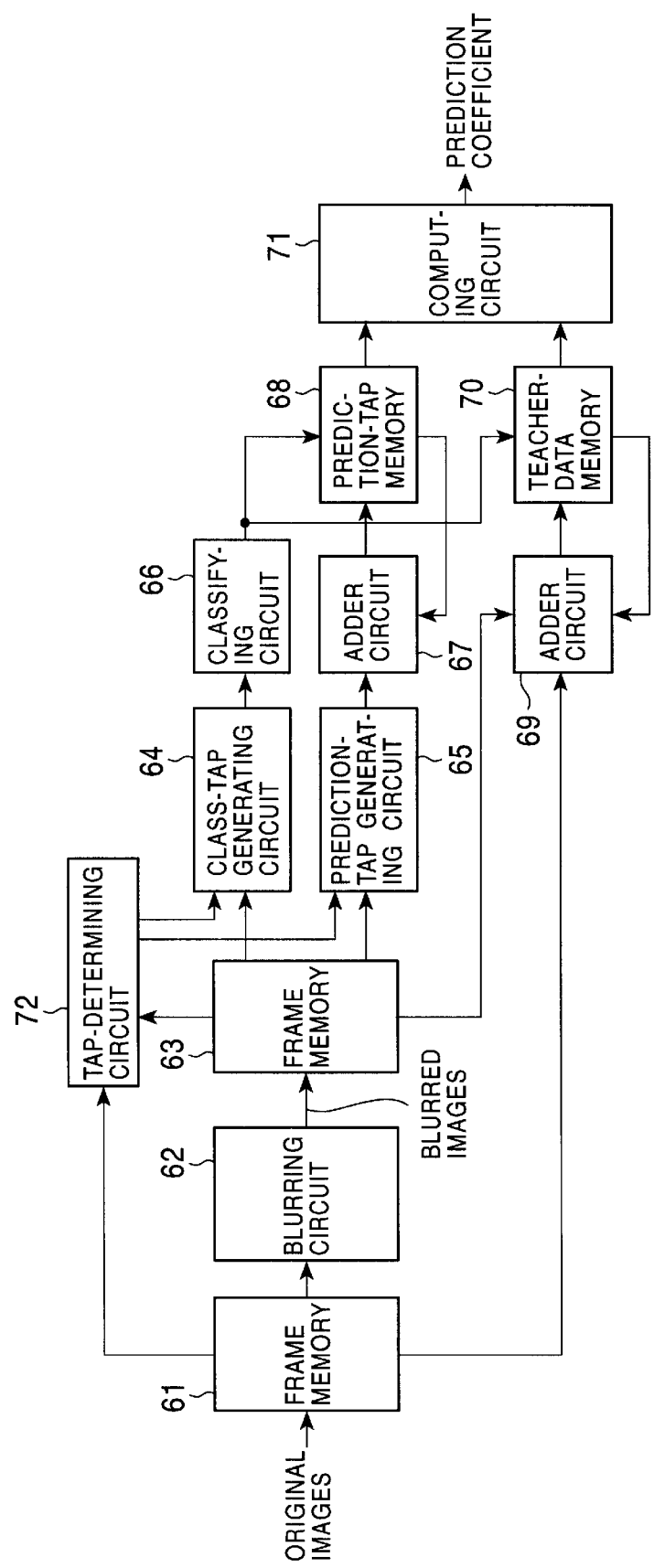
FIG. 7 is a block diagram showing a first embodiment of the image processing apparatus to which the present invention is applied.

Referring to FIG. 7, a first type of learning apparatus according to an embodiment of the present invention is below described which finds prediction coefficients for classes to be stored in the coefficient RAM 5 (shown in FIG. 1) and which finds a predetermined reference value to be set in the reference-value setting unit 14 (shown in FIG. 5).

A frame memory 61 is supplied with original images (here, blurless images) to be used as the teacher data y in, for example, units of frames. The original images are temporarily stored in the frame memory 61. A blurring circuit 62 generates blurred images (as the student data x) by reading the original images (to be used as the teacher data y in the learning of prediction coefficients) stored in the frame memory 61, and blurring original pixels constituting the original images (e.g., using a low-pass filter to perform filtering). The blurred images are supplied to a frame memory 63.

The frame memory 63 temporarily stores the blurred images from the blurring circuit 62.

The frame memories 61 and 63 have a structure identical to that of the frame memory 1.

A class-tap generating circuit 64 and a prediction-tap generating circuit 65 use the blurred-image constituting pixels (hereinafter referred to as the "blurring pixels") stored in the frame memory 63 to respectively generate a class tap and a prediction tap for each original pixel of interest in accordance with tap information from a tap-determining circuit 72, and respectively supplies the class tap and the prediction tap to a classifying circuit 66 and an adder circuit 67, similarly to the class-tap generating circuit 2 and the prediction-tap generating circuit 3 shown in FIG. 1.

The classifying circuit 66 has a structure identical to that of the classifying circuit 4 shown in FIG. 4. The classifying circuit 66 classifies, based on the class tap from the class-tap generating circuit 64, the original pixels of interest, and supplies the corresponding class code as an address to a prediction-tap memory 68 and a teacher-data memory 70.

The adder circuit 67 performs computation corresponding to summation ($\Sigma$) as a multiplier for the prediction coefficient w in each left side of the normalization equations (7) by reading the stored address corresponding to the class code output by the classifying circuit 66 from the prediction-tap memory 68, and adding the read value to the pixel level of each blurring pixel constituting the prediction tap, which is supplied from the prediction-tap generating circuit 65. The adder circuit 67 overwrites the computation result at an address in the prediction-tap memory 68, which corresponds to the class code output by the classifying circuit 66.

The prediction-tap memory 68 reads the stored address corresponding to the classifying circuit 66, supplies the read address to the adder circuit 67, and stores an output value from the adder circuit 67 at the supplied address.

The adder circuit 69 reads an original pixel of interest as a teacher data y from among the original pixels constituting the original images, which are stored in the frame memory 61, and reads an address stored in the teacher-data memory 70, which corresponds to the class code output from the classifying circuit 77. The adder circuit 69 adds the value read from the teacher-data memory 70 and the teacher data (original pixel) y read from the frame memory 61, thereby performing computation corresponding to summation ($\Sigma$) in each right side of the normalization equations (7). The adder circuit 69 overwrites the computation result at an address in the teacher-data memory 70, which corresponds to the class code output from the classifying circuit 70.

The adder circuits 67 and 69 also perform multiplication in expressions (7). Specifically, the adder circuit 67 performs multiplication of blurring pixels x constituting the prediction tap, and the adder circuit 69 performs multiplication of a blurring pixel x and the teacher data y. Accordingly, the blurring pixel x, required by the adder circuit 69, is read from the frame memory 63.

The teacher-data memory 70 reads the address stored corresponding to the class code output from the classifying circuit 66, supplies the read address to the adder circuit 69, and stores an output from the adder circuit 69 at the supplied address.

The computing circuit 71 can sequentially read the values stored at addresses corresponding to the class codes in the prediction-tap memory 68 and the teacher-data memory 70, and can solve the normalization equations (7), which uses the read values, whereby prediction coefficients for the classes can be found. In other words, the computing circuit 71 forms the normalization equations (7) based on the values stored at the addresses corresponding to the classes in the prediction-tap memory 68 and the teacher-data memory 70, and solves the equations, thereby finding the prediction coefficients for the classes.

The tap-determining circuit 72 performs a tap-determining process similar to that by the tap-determining circuit 7 shown in FIG. 1, whereby tap information on taps to be generated by the class-tap generating circuit 64 and the prediction-tap generating circuit 65 is determined and supplied to the class-tap generating circuit 64 and the prediction-tap generating circuit 65. The tap-determining circuit 72 also calculates the predetermined reference value which is used for the tap-determining process.

Referring to the flowchart shown in FIG. 8, a learning process in which the learning apparatus shown in FIG. 7 finds prediction coefficients for classes and the predetermined reference value is described below.

Original images (moving picture) as teacher data are supplied to the learning apparatus in units of frames, and the images are sequentially stored in the frame memory 61. The original images, stored in the frame memory 61, are supplied to the blurring circuit 62, in which the supplied images are processed to be blurred images. The blurring circuit 62 can generate blurred images having different degrees of blurring in units of frames.

The blurred images obtained in the blurring circuit 62 are sequentially supplied as student data to the frame memory 63.

When the blurred images corresponding to all the original images prepared for the learning process are stored in the frame memory 63, as described above, the tap-determining circuit 72 finds a reference value for the tap-determining process, as described later, and the process proceeds to step S22.

In step S22, the tap-determining circuit 72 determines blurring pixels constituting the taps, similarly to the tap-determining circuit 72 shown in FIG. 1, and outputs tap information on the blurring pixels to the class-tap generating circuit 64 and the prediction-tap generating circuit 65.

In step S23, in accordance with tap information from the tap-determining circuit 72, the class-tap generating circuit 64 and the prediction-tap generating circuit 65 read the blurring pixels constituting the class taps and the prediction taps from the frame memory 63, respectively, whereby the class taps and the prediction taps are formed. The class taps are supplied to the classifying circuit 66, and the prediction taps are supplied to the adder circuit 67.

In step S24, the classifying circuit 66 uses the class taps from the class-tap generating circuit 64 to classify the original pixels of interest, similarly to the classifying circuit 4 shown in FIG. 4. Class codes as the classifying results are supplied as addresses to the prediction-tap memory 68 and the teacher-data memory 70.

The process proceeds to step S25, and the addition of prediction taps (student data) and the addition of teacher data are performed.

In step S25, the prediction-tap memory 68-reads values stored at the addresses corresponding to the class codes output from the classifying circuit 66, and supplies the values to the adder circuit 67. The adder circuit 67 performs computation corresponding to summation ($\Sigma$) as a multiplier for the prediction coefficient w in each left side of the normalization equations (7), using the stored values supplied from the prediction-tap memory 68 and the blurring pixels constituting the prediction taps, which are supplied from the prediction-tap generating circuit 65. The adder circuit 67 overwrites the computation result at an address in the prediction-tap memory 68, which corresponds to the class code output by the classifying circuit 66.

In step S25, the teacher-data memory 70 reads the values stored at the addresses corresponding to the class codes output from the classifying circuit 66, and supplies the read values to the adder circuit 69. The adder circuit 69 reads the original pixels of interest from the frame memory 61, and reads necessary blurring pixels from the frame memory 63. The adder circuit 69 uses the read pixels and the stored values supplied from the teacher-data memory 70 to perform computation corresponding to summation ($\Sigma$) in each right side of the normalization equations (7). The adder circuit 69 stores the computation results at the addresses corresponding to the class codes output from the classifying circuit 66 so that they are overwritten.

The process proceeds to step S26, and determines whether the above-described processing using all the original pixels in the present block of interest has been performed. If the process has determined negatively, the process proceeds back to step S23. In step S23, among the original pixels in the block of interest, those unused as original pixels of interest are used as new original pixels of interest, and similar processing is performed.

If, for example, a controller or the like has determined in step S26 that the above-described processing has been performed using all the original pixels in the block of interest as original pixels of interest, the process proceeds to step S27, and the controller or the like determines whether there is a block to process, in other words, whether blurring pixels corresponding to the next block to be processed are stored in the frame memory 63. If the controller or the like has determined in step S27 that the blurring pixels corresponding to the next block to be processed are stored in the frame memory 63, the process proceeds back to step S22. In step S22, by using the stored block as a new block of interest, and using one of original pixels in the block of interest as a new original pixel of interest, similar processing is subsequently performed.

If the controller or the like has determined in step S27 that the blurring pixels corresponding to the next block to be processed are not stored in the frame memory 63, in other words, when the above-described processing is performed using all the original pixels prepared for learning, the process proceeds to step S28. In step S28, the computing circuit 71 sequentially reads the values stored at the addresses corresponding to the class codes from the prediction-tap memory 68 and the teacher-data memory 70, and establishes the normalization equations (7), which use the read values. The computing circuit 71 finds prediction coefficients for the classes by solving the normalization equations (7). In step S29, the computing circuit 71 outputs the obtained prediction coefficients for the classes, and the learning process ends.

In the above-described learning process of the prediction coefficients, a class may be generated in which normalization equations required for finding prediction coefficients cannot be obtained. For such a class, default prediction coefficients, or prediction coefficients obtained by predetermined learning with all pixels which are not classified, may be output.

Figure 9:
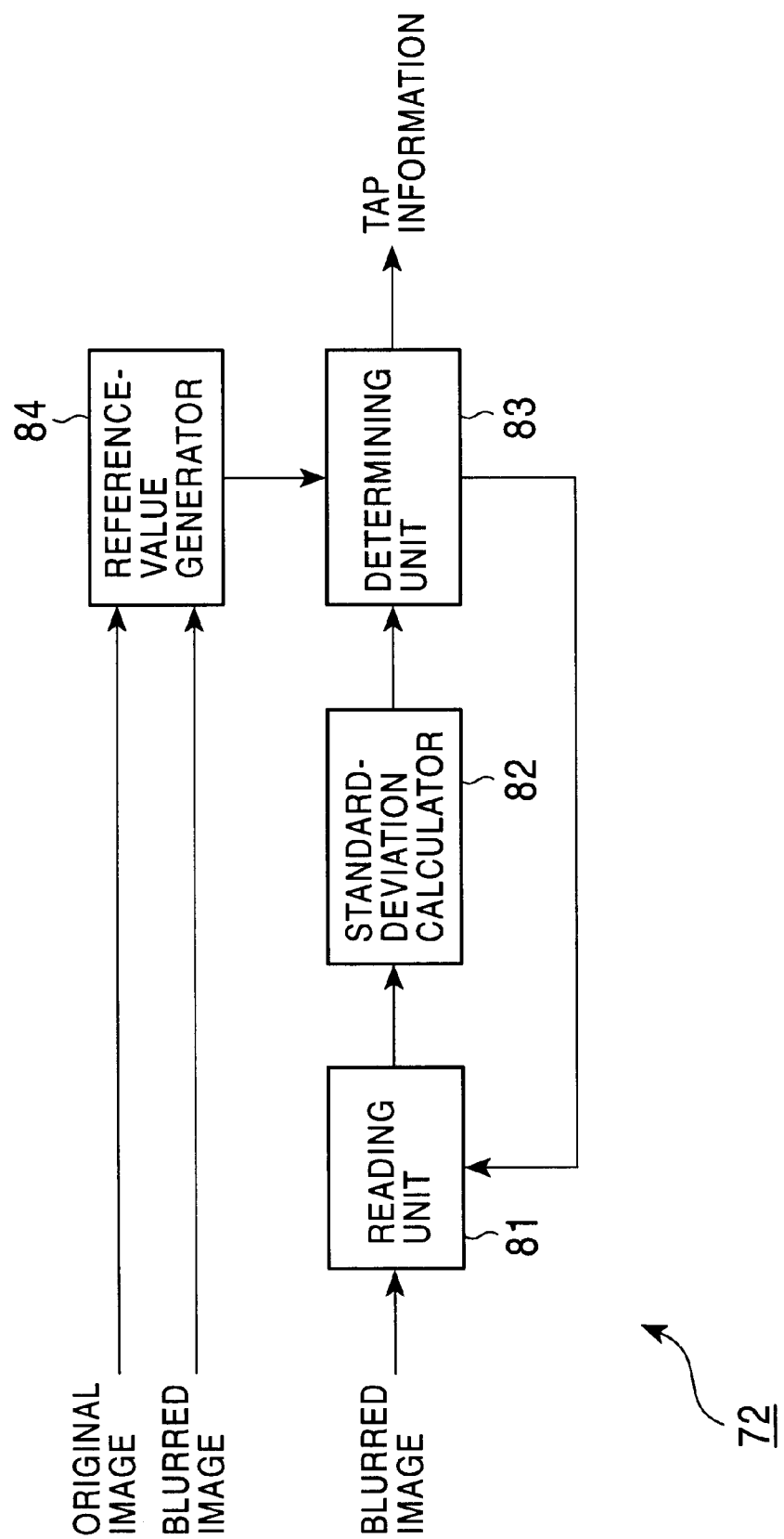
FIG. 9 is a block diagram showing the tap-determining circuit 72 shown in FIG. 7.

Referring to FIG. 9, the structure of the tap-determining circuit 72 (shown in FIG. 7) is described below.

As shown in FIG. 9, the tap-determining circuit 72 includes a reading unit 81, a standard-deviation calculator 82, a determining unit 83, and a reference-value generator 84. The reading unit 81, the standard-deviation calculator 82, and the determining unit 83 are identical in structure to the reading unit 11, the standard-deviation calculator 12, and the determining unit 13 (shown in FIG. 5), respectively. Accordingly, the tap-determining circuit 72 is identical in structure to the tap-determining circuit 7 (shown in FIG. 5), except that the reference-value generator 84 is provided instead of the reference-value-setting unit 14 (shown in FIG. 5).

Figure 8:
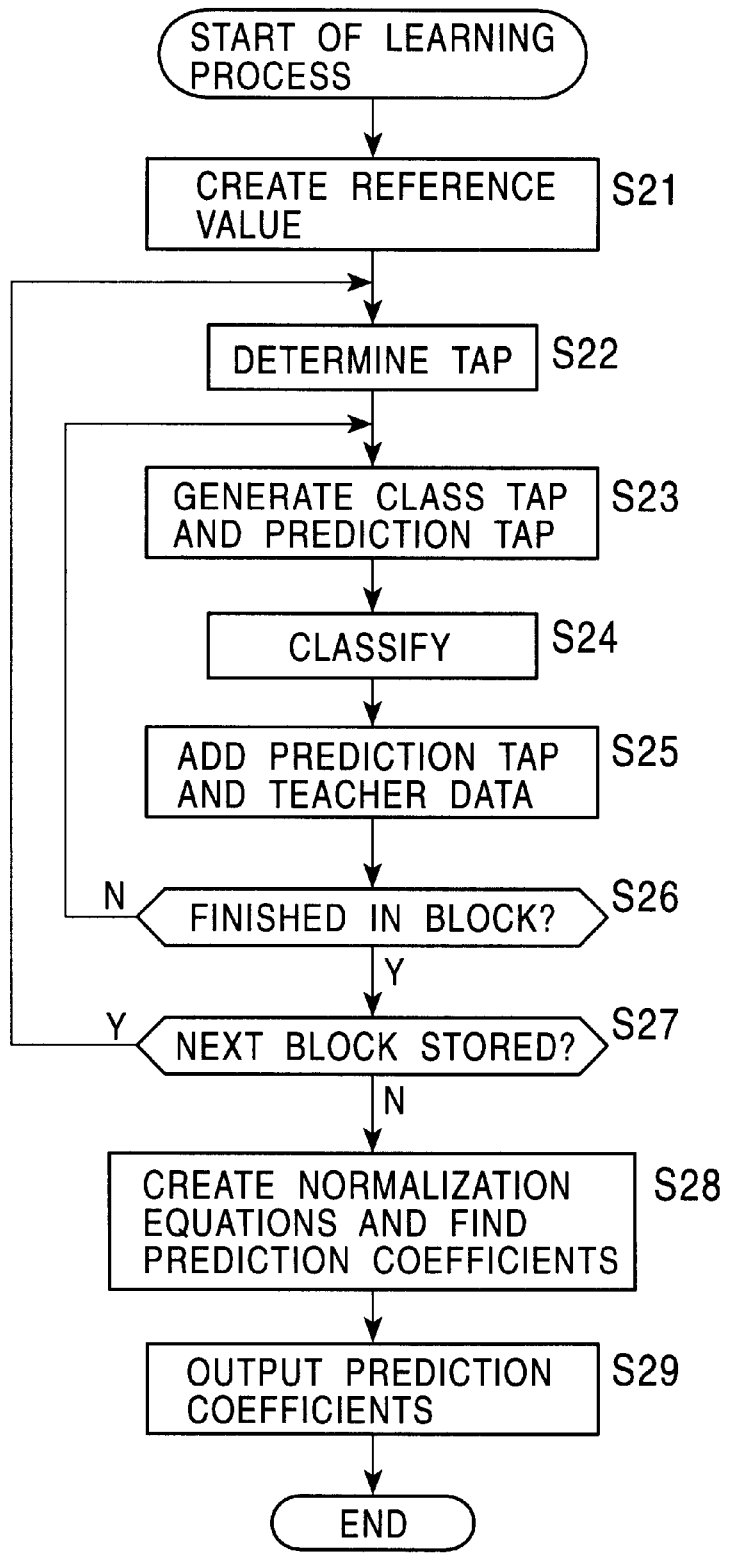
FIG. 8 is a flowchart illustrating a learning process by the learning apparatus shown in FIG. 7.

In step S21 shown in FIG. 8, the reference-value generator 84 finds a reference value for the tap-determining process, and supplies the value to the determining unit 83.

Figure 10:
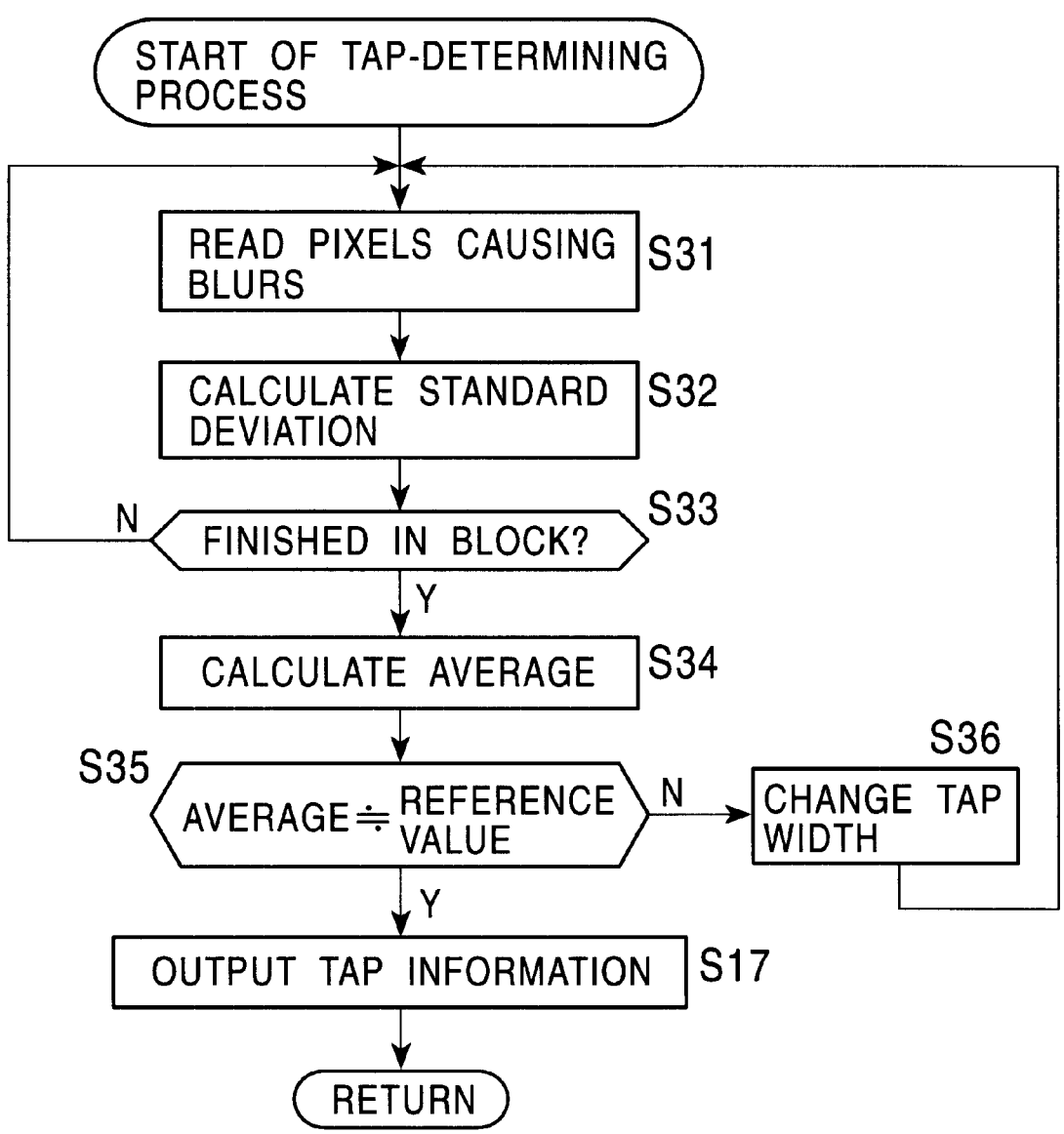
FIG. 10 is a flowchart illustrating a tap-determining process by the tap-determining circuit 72 shown in FIG. 9.

In steps S31 to S37 shown in FIG. 10, the tap-determining circuit 72 having the above-described structure performs processing similar to that in steps S11 to S17, whereby tap information for each block is determined.

Figure 11:
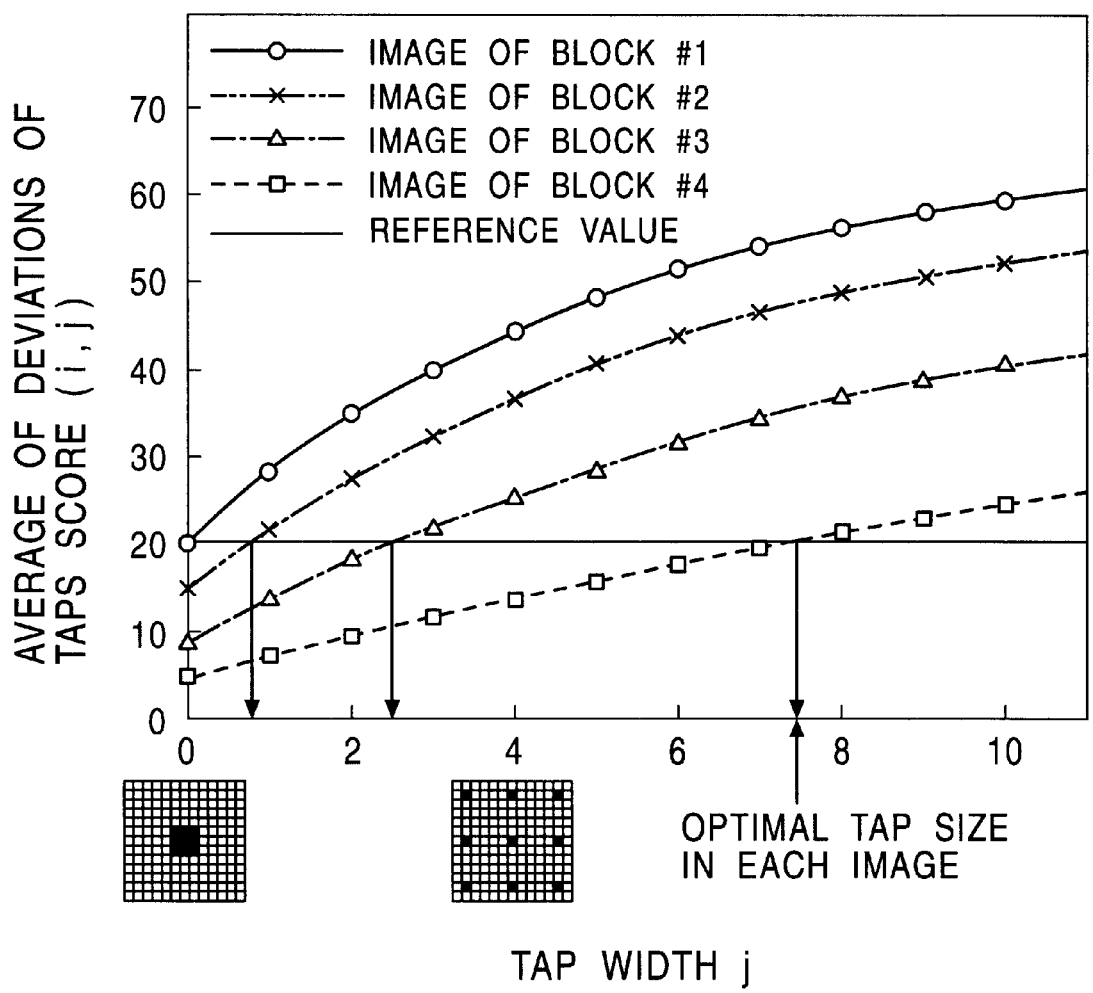
FIG. 11 is a graph showing relationships between a tap width and the average of standard deviations of taps, which are used for processing by the reference-value generator 84 shown in FIG. 9.
Figure 12:
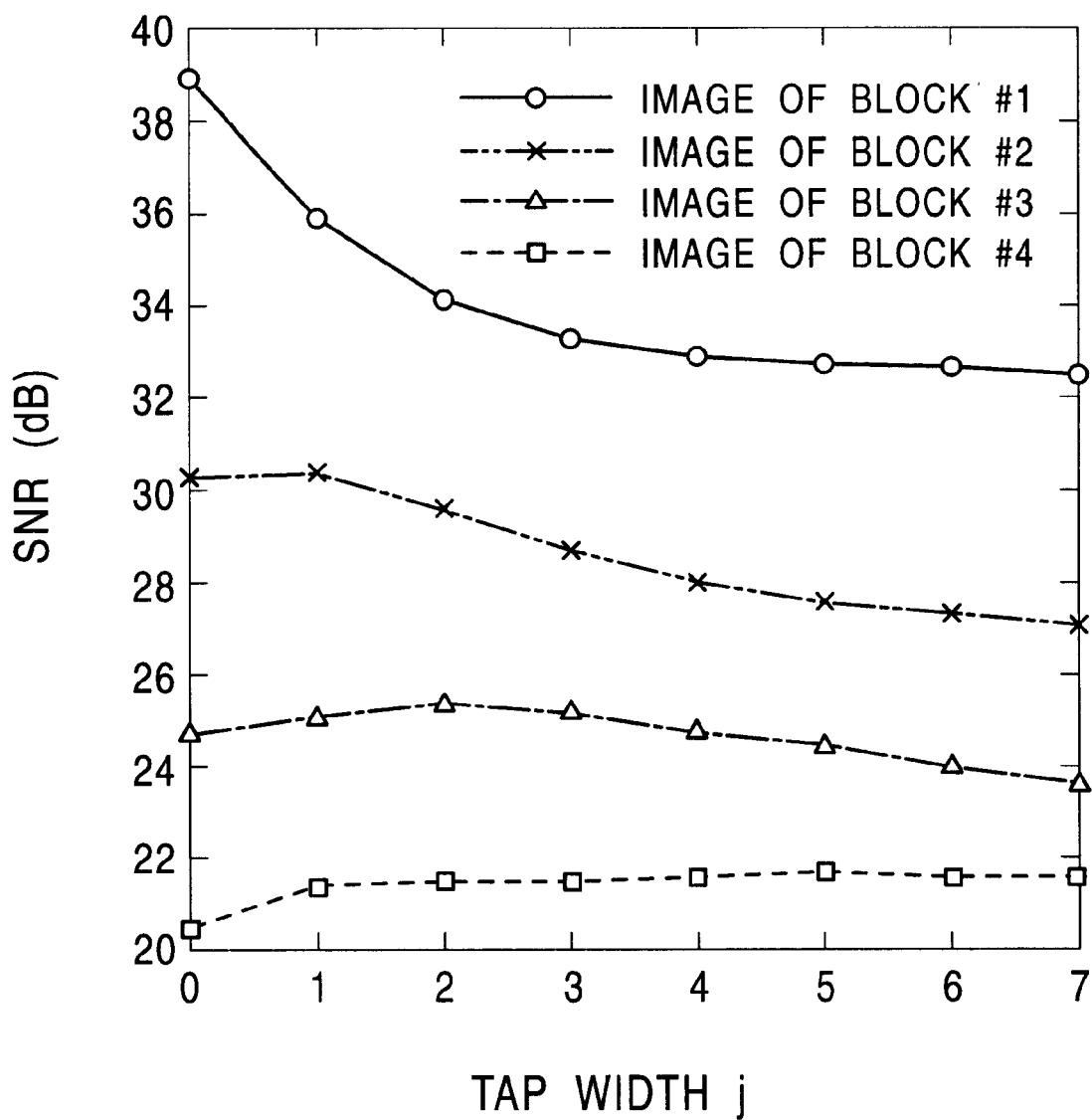
FIG. 12 is a graph showing relationships between a tap width and signal-to-noise ratios of predicted values of taps, which are used for processing by the reference-value generator 84 shown in FIG. 9.

With reference to FIGS. 11 and 12, calculation of the reference value by the reference-value generator 84 (shown in FIG. 9) is described below.

The reference-value generator 84 reads, from the frame memory 61, all original images prepared for the learning process, and reads, from the frame memory 63, blurred images (student data) in which the original images are blurred. The reference-value generator 84 divides each of the original images into blocks as described above, generates, for pixels in each of the blocks, taps having different tap widths, and finds relationships between the tap widths and the average of standard deviations of the blurred images constituting the taps.

In other words, when an attention is paid to a certain block, the reference-value generator 84 uses each original pixel of the block as an original pixel of interest to generate taps having a tap width j. The reference-value generator 84 finds standard deviations of taps generated for each original pixel, and calculates the average of the standard deviations in the block. Specifically, when the total number of original pixels in a block #i is represented by M, the total number of blurring pixels constituting taps is represented by K, the pixel level of the k-th blurring pixel in taps having a tap width j is represented by $V_{m,j,k}$, in which the k-th blurring pixel corresponds to the m-th pixel in the block #i, and the average of taps having the tap width j (i.e., the average of blurring pixels constituting the taps) is represented by $mean_{m,j}$, score(i,j) is computed in accordance with expression (8) by the reference-value generator 84.

The reference-value generator 84 generates taps for each original pixel in the block #1, while changing the tap width j into several values, and sequentially the average, score(i,j), of the standard deviations of the taps having each value of the tap width j.

The reference-value generator 84 similarly computes the average, score(i,j), of the standard deviations of the taps having each value of the tap width i.

As described above, for each block #i, the reference-value generator 84 finds relationships between the tap width j and the average, score(i,j), of the standard deviations of the taps having the tap width j, as shown in FIG. 11.

FIG. 11 shows relationships between the tap width j and the average, score(i,j), of the standard deviations of the taps having the tap width j in four blocks #1 to #4. In FIG. 11, the circular symbols indicate values concerning the block #1, the cross symbols indicate values concerning the block #2, the triangular symbols indicate values concerning the block #3, and the square symbols indicate value concerning the block #4.

FIG. 11 shows values of the average, score(i,j), of the standard deviations of the taps, which are obtained when the tap width j is set to zero (0) to 10.

The average, score(i,j), of the standard deviations of taps generated for each original pixel of the block i indicates how the pixel level of a blurred image for the block #i changes, that is, the degree of blurring. Accordingly, as the greater (smaller) the score(i,j), the smaller (greater) the degree of blurring.

When finding the average, score(i,j), of the standard deviations of taps, the reference-value generator 84 simultaneously finds predicted values based on the original pixels by performing classification adaptive processing using the taps having the tap width j.

In other words, the reference-value generator 84 uses the original pixels in the block #i and the blurring pixels to fix the tap width j to a predetermined value, establishes, and solves the normalization equations (7), whereby prediction coefficients for the classes are found. The reference-value generator 84 also uses the prediction coefficients for the classes, fixes the tap width j to the predetermined value, and performs computation based on expression (1), whereby predicted values based on each original image in the block #i are found.

The reference-value generator 84 performs similar processing while sequentially changing the tap width j, and performs similar processing on other blocks. Thereby, for the original pixels in each block, predicted values e(i,j) obtained when taps having each value of the tap width j are found. In other words, for original pixels in each block #i, the relationship between the tap width j of taps for predicting the original pixels and a predicted value (i,j) based on each original pixel is found.

The reference-value generator 84 determines how much the obtained predicted value e(i,j) is close to the original image. In other words, for, e.g., the block #i, the reference-value generator 84 finds, as a signal-to-noise ratio of the predicted value e(i,j), the reciprocal of the sum of absolute-value differences between the original pixels and each predicted value e(i,j) obtained with taps having the tap width j. Signal-to-noise ratios obtained for the four blocks #1 to #4 shown in FIG. 11 are shown in FIG. 12.

In FIG. 12, a predicted value e(1,0), obtained using taps having a tap width of zero, has a most preferable signal-to-noise ratio, which means that the e(1,0) is closest to the original image. In the reference-value generator 84, a block #i from which the predicted value e(i,j) closest to the original image is obtained, and a tap width j are detected. The block #1 and the tap width j, detected as described above, are hereinafter referred to as the "optimal block and the "optimal tap width", respectively.

Since each predicted value e(i,j), obtained when taps having an optimal tap width j are generated for the optimal block, is closest to the original image, a standard deviation (hereinafter referred to also as an "optimal standard deviation") of taps when the taps are generated to have an optimal tap width is considered as an optimal standard deviation for taps generated for other blocks.

In other words, it is possible from a statistic aspect that, for each of the other blocks, when taps having a tap width, in which a standard deviation from the block is used as the optimal standard deviation, are generated, predicted values closest to the original image are obtained.

Accordingly, the reference-value generator 84 finds the optimal standard deviation, and supplies the optimal standard deviation as a predetermined reference value to the determining unit 83.

In FIG. 12, the predicted value e(1,0), obtained for the block #1 by using taps having a tap width j of zero, has a most preferable signal-to-noise ratio. Thus, among values of the score(1,j) obtained for the block #1, which are indicated by the circular symbols shown in FIG. 11, the value 20, obtained when the tap width j is zero, is found as the optimal standard deviation.

For the other blocks, each value indicated by the bold arrow shown in FIG. 11 is the tap width j based on which a standard deviation corresponding to the optimal standard deviation is obtained. Therefore, in the tap-determining processes shown FIGS. 6 and 10, the determined taps have the tap width j based on which the optimal standard deviation is obtained.

Although the tap width j takes integer values, the tap width (each value indicated by the bold arrow shown in FIG. 11) based on which a standard deviation corresponding to the optimal standard deviation is obtained.does not always take integer values (does not take integer values in many cases), as can be clear from FIG. 11. Accordingly, in the tap-determining processes shown in FIGS. 6 and 10, when the tap width based on which a standard deviation corresponding to the optimal standard deviation is obtained is not an integer value, an integer value closest the tap width which is not the integer value is determined as the final tap width.

Figure 6:
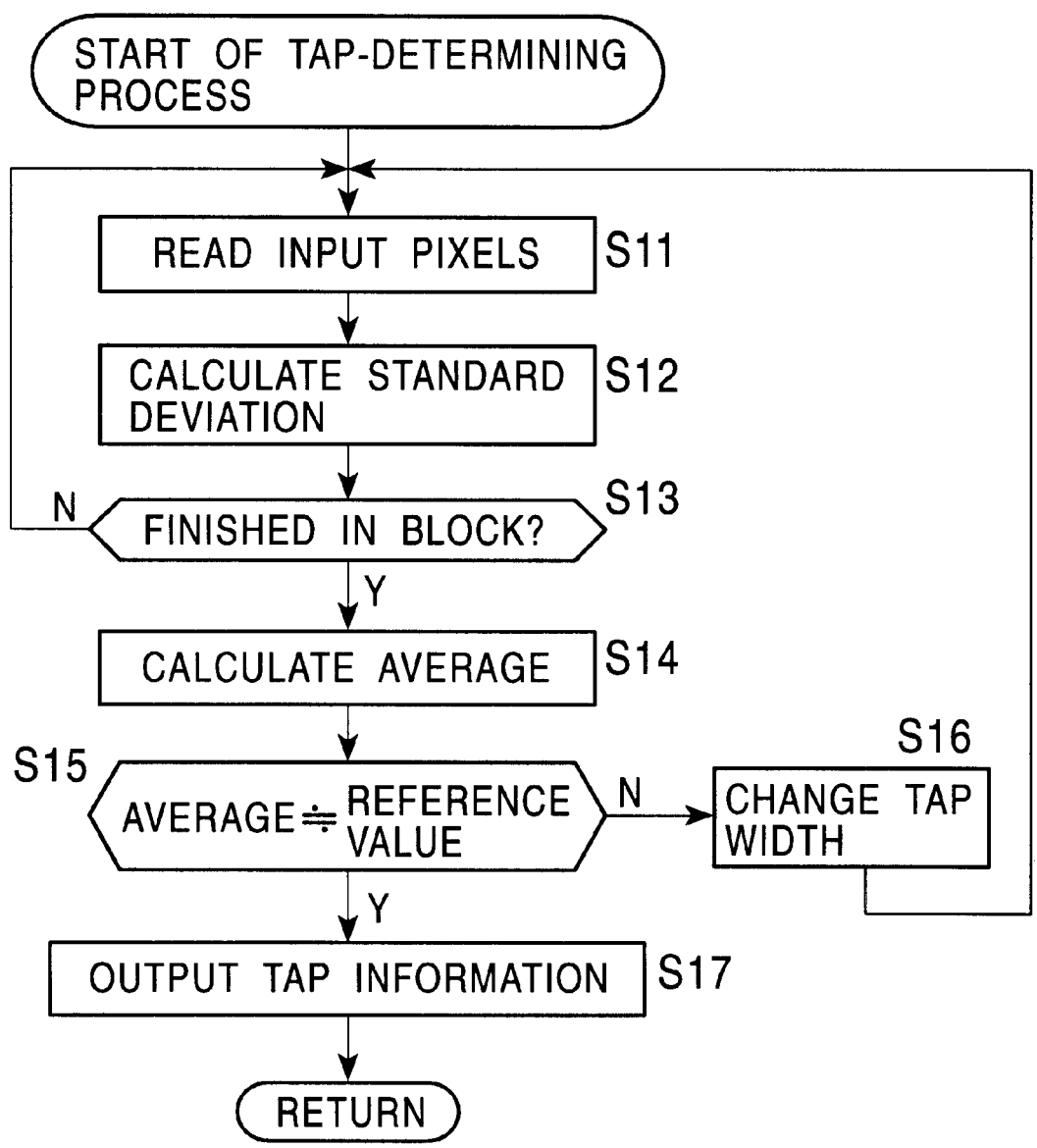
FIG. 6 is a flowchart illustrating a tap-determining process by the tap-determining circuit 7 shown in FIG. 5.

Specifically, in the tap-determining process shown in FIG. 6 (similarly to that shown in FIG. 10), the process determines whether the score(i,j) from the standard-deviation calculator 12 is close to the reference value set in the reference-value setting unit 14 (step S15). If the process has determined affirmatively, a tap width j at the time the determination is performed is output as tap information (step S17). That "the score(i,j) is close to the reference value" means that a standard deviation score(i,j) (the average of standard deviations obtained for the block in this embodiment) of taps having a tap width j of an integer value, obtained when the taps are generated, is closest to the reference value.

In the tap-determining processes shown in FIGS. 6 and 10, it is possible to perform finding a tap width based on which a standard deviation corresponding to the optimal standard deviation is obtained, and generating, when the tap width is not an integer value, taps in which the average of tap widths is used as the average of the tap widths. In other words, when the tap width based on which the standard deviation corresponding to the optimal standard deviation is, for example, 1.5, by generating taps so that the tap width between pixels is 2, the average of tap widths can be set to 1.5.

As described above, the learning process and the blur-reducing process are performed by finding an optimal standard deviation, and generating taps having a tap width based on which a standard deviation corresponding to the optimal standard deviation is obtained. Therefore, the processing performance can be increased.

In other words, in the learning process, classification adapted for the degree of blurring of each image is performed, and prediction taps adapted for the degrees of blurring are generated. As a result, prediction coefficients adapted for the degrees of blurring of images, which correspond to classes, can be obtained. Also in the blur-reducing process, classification adapted for the degree of blurring of each image is performed, prediction taps adapted for the degrees of blurring are generated, and predicted values based on original pixels are found using the prediction coefficients for classes, which are adapted for the degrees of blurring. As a result, clear images (images in which blurs are reduced) can be obtained, regardless of the degrees of blurring.

Specifically, when the classification adaptive processing is performed using, for example, input images having a small degree of blurring, as described above, classification in which the characteristics of original pixels of interest are reflected can be performed by preferably using input pixels which are relatively close to the original pixels of interest. When the classification is performed using input images having a large degree of blurring, classification in which the characteristics of original pixels of interest are reflected can be performed by preferably using input pixels which are relatively far from the input pixels.

In the case shown in FIG. 11, the greater the score(i,j), the smaller the degree of blurring, as described above. Thus, the degree of blurring increases in the order of the blocks #1, #2, #3, and #4. In the case shown in FIG. 11, taps that have tap widths of 0, 1, 3, and 8 are generated for the blocks #1, #2, #3, and #4.

Accordingly, according to the present invention, as the degree of blurring increases, class taps are generated using input pixels which are far from original pixels of interest. Thus, classification in which the characteristics of images are reflected is performed.

In the first embodiment, tap information is determined based on a standard deviation of taps. However, the tap information may be determined based on a statistic other than the standard deviation of taps. That is, the tap information may be determined based on, for example, distribution of pixels constituting the taps, the absolute sum of differences among the pixels, the absolute sum of second-order differences (the absolute sum of differences among differences of pixels), or the like.

In the first embodiment, a tap width is changed for each block composed of a plurality of pixels. However, the tap width may be changed for, for example, each pixel unit.

In the first embodiment, prediction coefficients are pre-stored in the coefficient RAM 5. However, the prediction coefficients may be supplied to the image processing apparatus, with, for example, input images. Similarly, a reference value does not need to be set in the reference-value setting unit 14, but may be supplied to the image processing apparatus, with the input images.

In the first embodiment, the arrangement of taps (pixels constituting taps) is changed by changing the tap width based on a statistical value of input images. However, the tap structure may be changed by, for example, changing the positions of pixels constituting the tap. Tap widths do not need to be at equal intervals. For example, it is possible to radially expand four taps in the four corners of, for example, a 3×3 tap, using the center pixel as the center.

In the first embodiment, a first-order expression is used to find predicted values based on original pixels. However, an expression having an order not less than the second order may be used to find the predicted values.

In the learning process, addition corresponding to the summation ($\Sigma$) in expressions (7) is performed using prediction taps, as described above. However, addition using prediction taps having different tap widths is performed using corresponding pixels in the prediction taps.

When a prediction tap is generated so as to have nine pixels (three pixels by three pixels) around the center pixel in the center, in the first embodiment, a prediction tap having a tap width of zero (FIG. 3A) and a prediction tap having a tap width of one (FIG. 3B) are generated. In this case, a pixel of the prediction tap having a tap width of zero, for example, the top leftest pixel is added to the top leftest pixel of the prediction tap having a tap width of one.

Also classification of class taps having different tap widths is performed using a similar technique. Therefore, by way of example, when the pixel level of each pixel constituting the prediction tap (shown in FIG. 3A) having a tap width of zero is equal to the pixel level of each pixel constituting the prediction tap (shown in FIG. 3B) having a tap width of one, a result of classification using the class tap shown in FIG. 3A and a result of classification using the class tap shown in FIG. 3B are the same (the taps are classified into the same class).

Next, with reference to FIG. 1, a second embodiment of an image processing apparatus to which the present invention is applied is described below.

The image processing apparatus according to the second embodiment differs from the first embodiment in that, when an SD image having a low resolution is input as an input image to the image processing apparatus, the image processing apparatus uses the classification adaptive processing to process the input image, whereby an HD image having a high resolution is output. Since the components of the image processing apparatus according to the second embodiment are identical to those in the first embodiment, descriptions thereof are partially omitted.

The tap-determining circuit 7 determines, based on waveform characteristics of the input images stored in the frame memory 1, input pixels constituting the class taps and the prediction taps, and supplies the class-tap generating circuit 2 and the prediction-tap generating circuit 3 with information on the input pixels constituting the class taps and the prediction taps.

Figure 13:
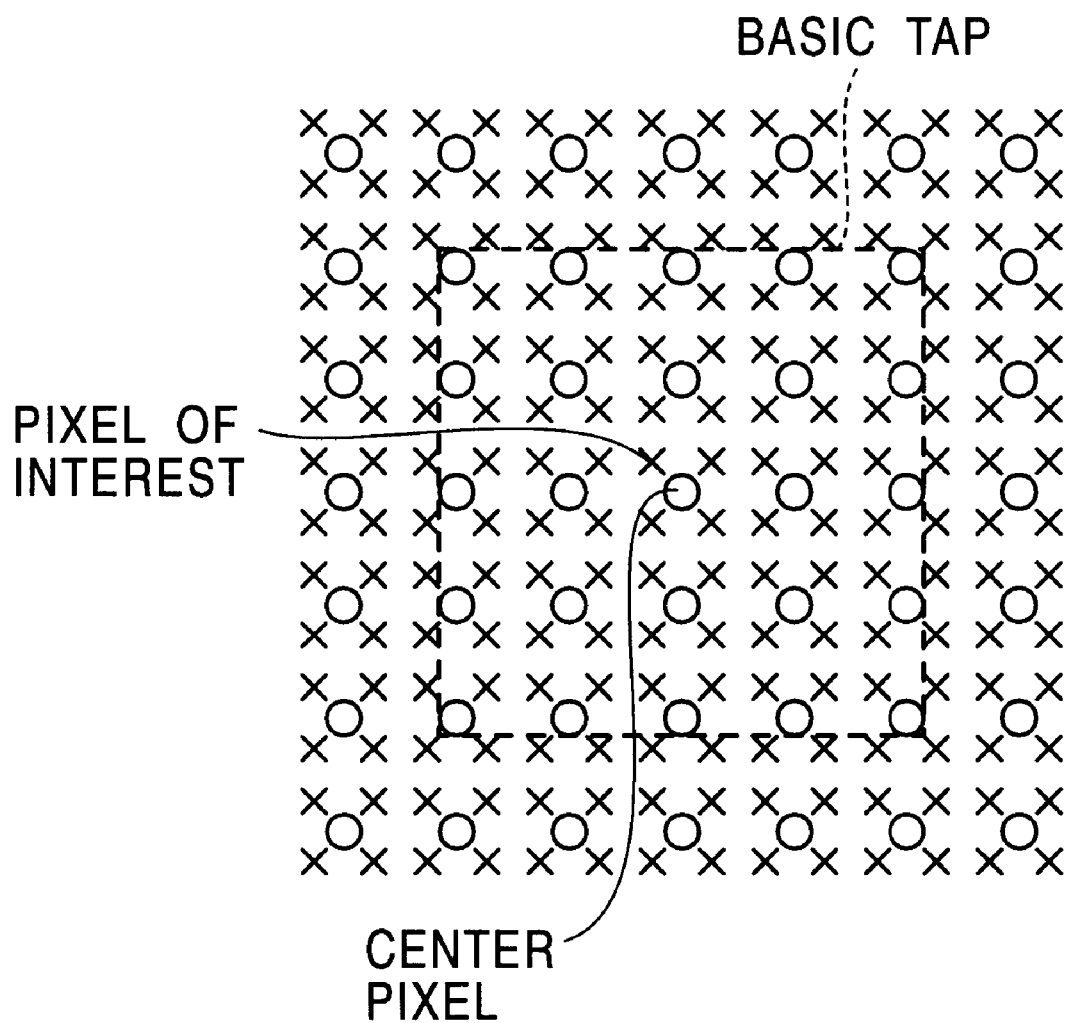
FIG. 13 is an illustration of a basic tap set by the tap-determining circuit 7 in a second embodiment of the present invention.

The tap-determining circuit 7 determines, as basic taps, for example, a square class tap to be generated by the class-tap generating circuit 2 and a square prediction tap to be generated by the prediction-tap generating circuit 3, each of which consists of five vertical pixels and five horizontal pixels, in which an input pixel adjacent to a pixel of interest is used as a center pixel (meaning, for example, a pixel at the position of the centroid), as indicated by the dotted line shown in FIG. 13.

In FIG. 13, the cross symbols indicate pixels (HD pixels) constituting an HD image, and the circular symbols indicate pixels (SD pixels) constituting an SD image as an input image. Accordingly, in FIG. 13, the SD image has a size obtained by reducing the numbers of vertical pixels and horizontal pixels to half.

Figure 14:
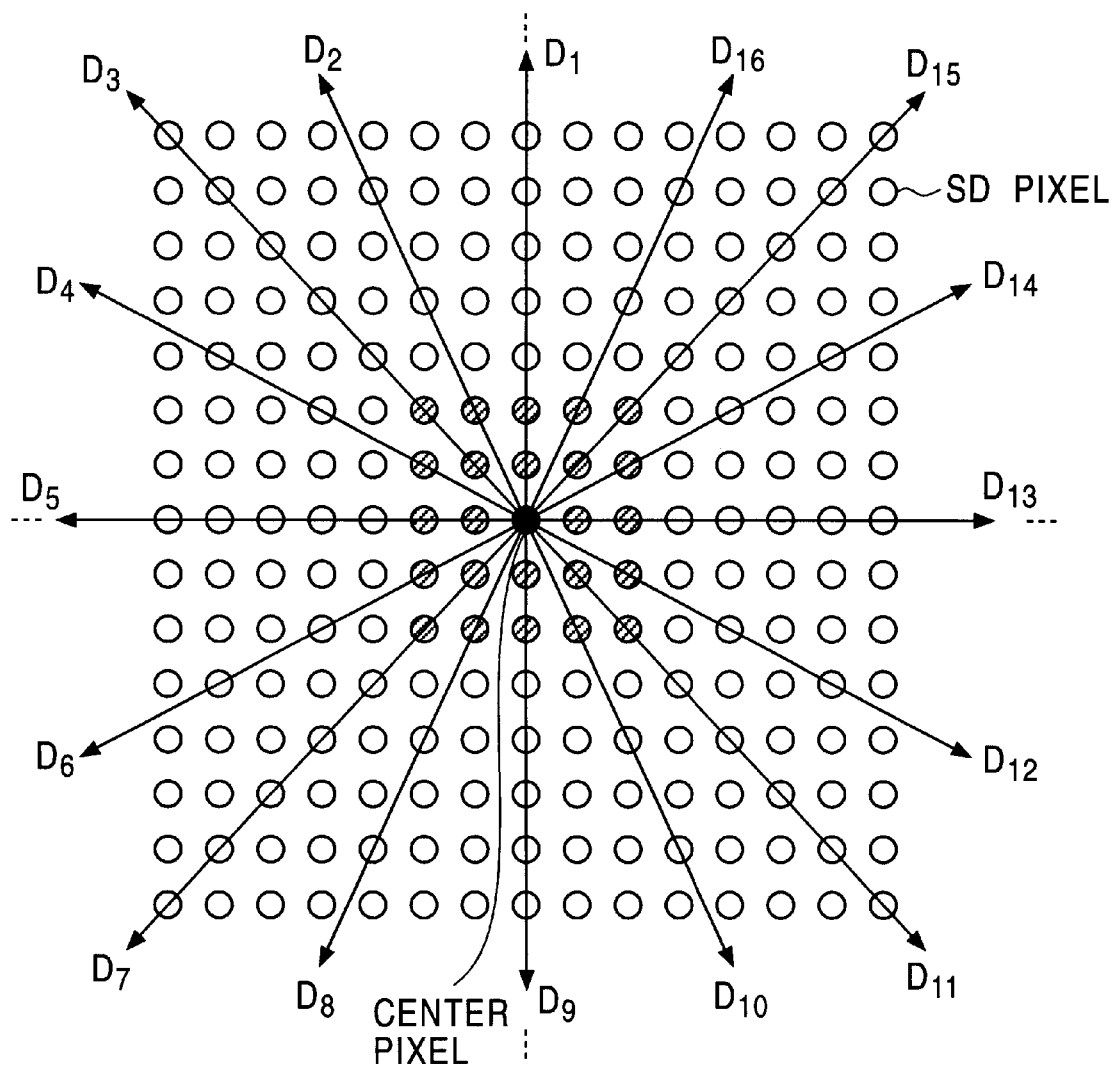
FIG. 14 is an illustration of directions from the center pixel as a start point, which are detected by the tap-determining circuit 7 shown in FIG. 1.
Figure 15:
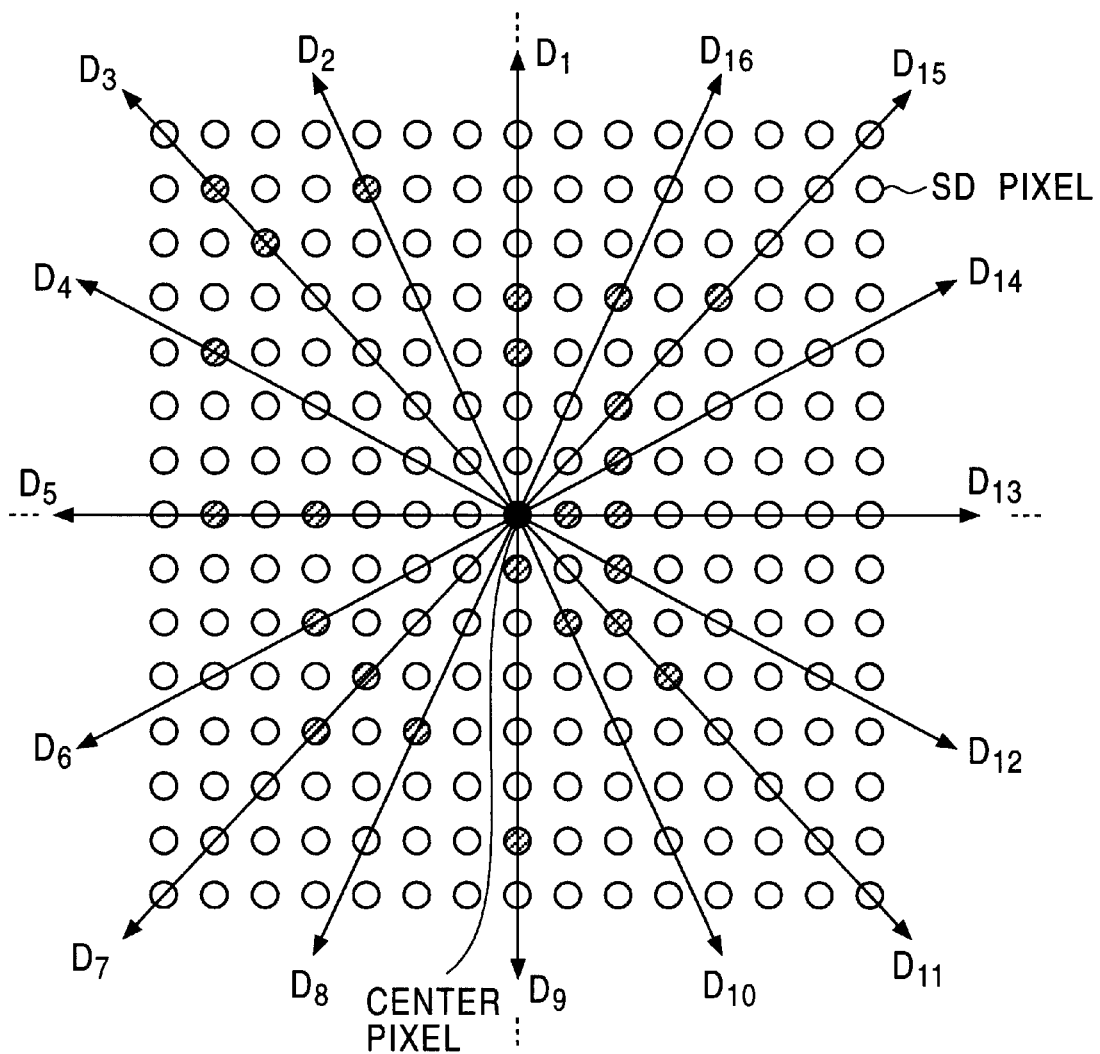
FIG. 15 is an illustration of a tap arrangement in which taps are moved in accordance with waveform characteristics of the directions shown in FIG. 14 by the tap-determining circuit 7 shown in FIG. 1.

When determining each basic tap, the tap-determining circuit 7 detects directions from the center pixel as a start point to other SD pixels (input pixels) of the basic tap, as shown in, for example, FIG. 14. When the basic tap consists of 5×5 pixels, sixteen directions $D_1$ to $D_{16}$ from the center pixel as the start point are detected, as shown in FIG. 14.

For each direction $D_i$ (i=1, 2, ..., 16), the tap-determining circuit 7 determines, based on waveform characteristics (pixel-level characteristics) of SD pixels in the direction, SD pixels for finally generating a tap. In other words, for each direction $D_i$, based on the waveform characteristics of SD pixels in the direction, the positions of the SD pixels constituting a tap in the direction are shifted. The tap-determining circuit 7 supplies the class-tap generating circuit 2 and the prediction-tap generating circuit 3 with, as tap information, information on the positions of SD pixels for finally generating the tap as a result of the shifting.

With reference to the flowchart shown in FIG. 16, a resolution-increasing process that increases the resolution of an input image by the image processing apparatus shown in FIG. 1 is described below.

SD images (moving picture) to be processed by the resolution-increasing process are sequentially supplied as input images in units of frames to the frame memory 1. In the frame memory 1, the input images are sequentially stored in units of frames.

A predetermined HD pixel based on which a predetermined is found is used as a pixel of interest. In step S41, the tap-determining circuit 7 determines, based on waveform characteristics of the input images stored in the frame memory 1, input pixels for generating taps based on the pixel of interest, and outputs tap information on the positions of the input pixels to the class-tap generating circuit 2 and the prediction-tap generating circuit 3.

In step S42, when receiving the tap information from the tap-determining circuit 7, the class-tap generating circuit 2 and the prediction-tap generating circuit 3 respectively read, from the frame memory 1, the input pixels for generating class taps and prediction taps based on the pixel of interest from which a predicted value is found, and generate the class taps and the prediction taps. The class taps and the prediction taps are supplied to the classifying circuit 4 and the prediction arithmetic circuit 6, respectively.

In step S43, when receiving the class taps from the class-tap generating circuit 2, the classifying circuit 4 classifies pixels of interest, based on the class taps, and outputs, addresses, class codes obtained as a result of the classification to the coefficient RAM 5. In step S44, the coefficient RAM 5 reads a prediction coefficient stored at the address corresponding to each class code, and supplies the class code to the prediction arithmetic circuit 6.

In step S45, the prediction arithmetic circuit 6 uses the prediction tap from the prediction-tap generating circuit 3 and the prediction coefficient from the coefficient RAM 5 to perform linear predicting computation represented by expression (1), whereby the predicted values E[y] based on the pixels y of interest are found. After that, the process proceeds to step S46. In step S46, the prediction arithmetic circuit 6 outputs, as HD pixels having increased resolution, to the predicted values E[y] based on the pixels y of interest, which are obtained in step S45, and the process proceeds to step S47.

In step S47, the controller or the like determines whether all predicted values of HD pixels constituting the frame including the pixel of interest have been found. If the controller or the like has determined negatively, the process proceeds back to step S41, and the steps from step S41 are repeatedly performed using, as new pixels of interest, HD pixels from which predicted values have not been found yet.

If the controller or the like has determined in step S47 that all the predicted values of HD pixels constituting the frame including the pixel of interest have been found, the process proceeds to step S48. In step S48, the controller or the like determines whether an input image (SD image) corresponding to the next frame of an HD image to be processed is stored in the frame memory 1. If the controller or the like has determined in step S48 that the input image corresponding to the next frame of the HD image to be processed is stored in the frame memory 1, a predetermined HD pixel in the next frame of the HD image to be processed is used as a new pixel of interest, and the process proceeds back to step S1. Subsequently, similar processing is repeatedly performed.

If the controller or the like has determined in step S48 that the input image corresponding to the next frame of the HD image to be processed is not stored in the frame memory 1, the resolution-increasing process is terminated.

Figure 16:
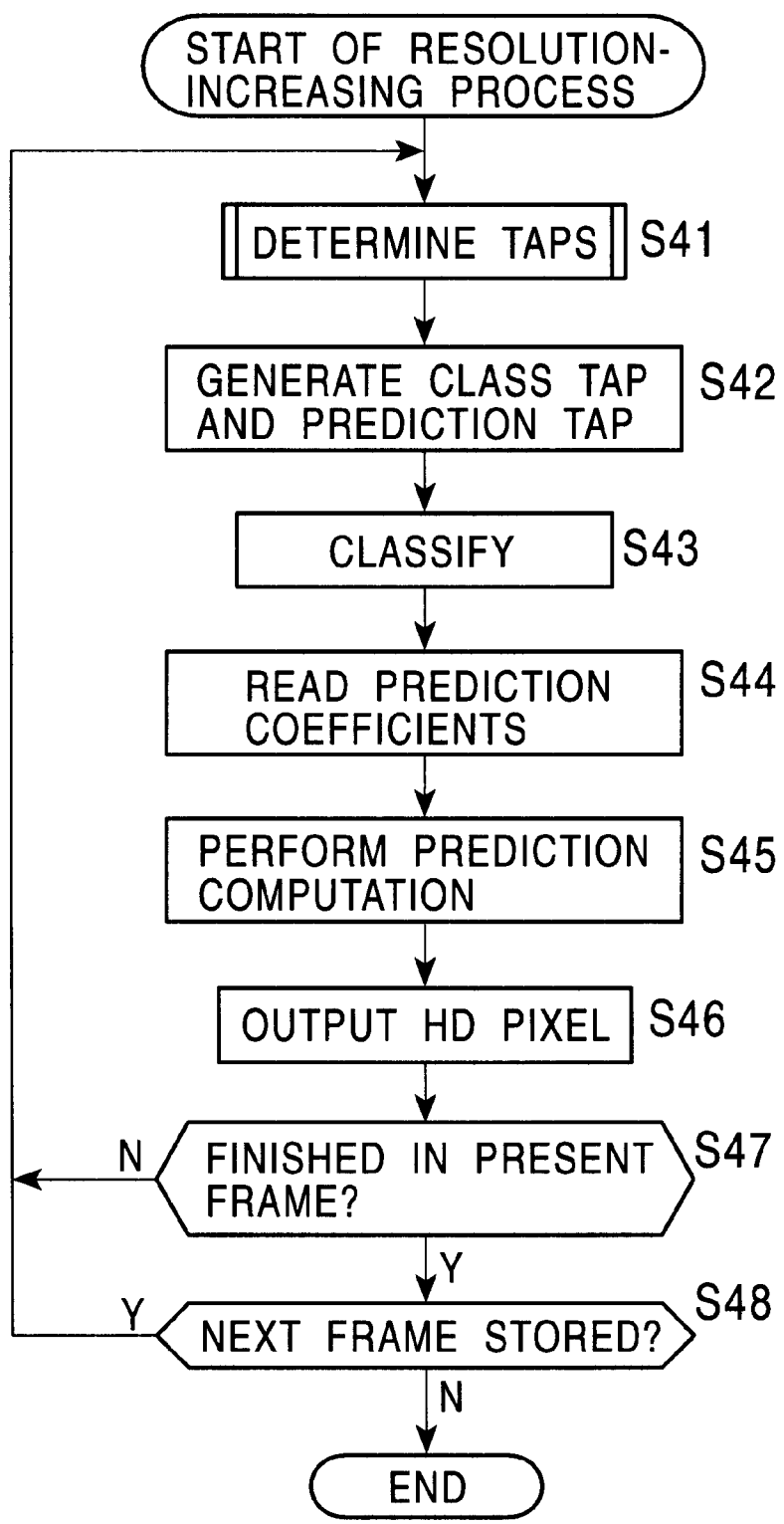
FIG. 16 is a flowchart illustrating a blur-reducing process by the image processing apparatus shown in FIG. 1.

With reference to the flowchart shown in FIG. 17, a first modification of the tap-determining process performed by the tap-determining circuit 7 in step S41 shown in FIG. 16 is described below.

In addition to an entire set of SD pixels for use in classification and computation based on the linear prediction expressions (1), each of the pixels is hereinafter referred to also as a "tap".

In step S51, the tap-determining circuit 7 sets a basic tap. Specifically, in step S51, the tap-determining circuit 7 sets, as a basic tap, a tap composed of five vertical pixels and five horizontal pixels in which an input pixel at the position of a pixel of interest is used as a center pixel, as indicated by the dotted line shown in FIG. 13. The tap-determining circuit 7 proceeds to step S52.

In step S52, the tap-determining circuit 7 detects sixteen directions $D_1$ to $D_{16}$ from the center pixel as a start point to other SD pixels in the basic tap, and the process proceeds to step S53.

In step S53, a variable i that represents the sixteen directions detected in step S52 is initialized to, for example, "1" by the tap-determining circuit 7, and the tap-determining circuit 7 proceeds to step S54. In step S54, a variable j that represents a tap in each direction $D_i$ is initialized to, for example, "1" by the tap-determining circuit 7, and the tap-determining circuit 7 proceeds to step S55.

In step S55, the tap-determining circuit 7 determines whether the pixel level of an SD pixel, used as the j-th tap $T_{i,j}$ from the center pixel in the direction $D_i$, is extreme.

If the tap-determining circuit 7 has determined in step S55 that the level of the SD pixel, used as the j-th tap $T_{i,j}$ from the center pixel in the direction $D_i$, is not extreme, the tap-determining circuit 7 proceeds to step S56, and the tap $T_{i,j}$ in the direction $D_i$ and outer taps therefrom (far from the center pixel) are moved, for example, one pixel away from the center pixel. The tap-determining circuit 7 proceeds back to step S55, and similar processing is repeatedly performed.

If the tap-determining circuit 7 has determined in step S55 that the level of the SD pixel, used as the j-th tap $T_{i,j}$ from the center pixel in the direction $D_i$, is extreme, the tap-determining circuit 7 proceeds to step S57. In step S57, the variable j is incremented by one, and the tap-determining circuit 7 proceeds to step S58. In step S58, the tap-determining circuit 7 determines whether the variable j is not more than the number $J_i$ of pixels (in the direction $D_i$) constituting taps other than the center pixel.

Here, in FIG. 14, $J_i$ for the directions $D_1, D_3, D_5, \ldots, D_{15}$ is, for example, 2, and $J_i$ for the directions $D_2, D_4, D_6, \ldots, D_{16}$ is, for example, 1.

If the tap-determining circuit 7 has determined in step S58 that the variable j is not more than the number $J_i$ of pixels (in the direction $D_i$) constituting taps other than the center pixel, that is, when all SD pixels (in the direction $D_i$) constituting the taps other than the center pixel are not extreme, the tap-determining circuit 7 proceeds back to step S55, and similar processing on taps $T_{i,j}$ at the positions of the SD pixels which have not reached their extremes is repeatedly performed.

If the tap-determining circuit 7 has determined in step S58 that the variable j is more than the number $J_i$ of pixels (in the direction $D_i$) constituting taps other than the center pixel, that is, when all SD pixels (in the direction $D_i$) constituting the taps other than the center pixel are extreme, the tap-determining circuit 7 proceeds to step S59, and the variable i is incremented by one. The tap-determining circuit 7 proceeds to step S60, and determines whether the variable i is not more than a total number I (16 in the case shown in FIG. 14) of the directions detected in step S52.

If the tap-determining circuit 7 has determined in step S60 that the variable i is not more than the total number I, that is, when the SD pixels which are extreme have not been used as taps yet for all the directions detected in step S52, the tap-determining circuit 7 proceeds back to step S54, and similar processing is repeatedly performed.

If the tap-determining circuit 7 has determined in step S60 that the variable i is more than the total number I, that is, when the SD pixels which are extreme have been used as taps for all the directions detected in step S52, the tap-determining circuit 7 proceeds to step S61. In step S61, the information on the positions of the SD pixels constituting the taps are output as tap information to the class-tap generating circuit 2 and the prediction-tap generating circuit 3, and the process returns.

Figure 18A:
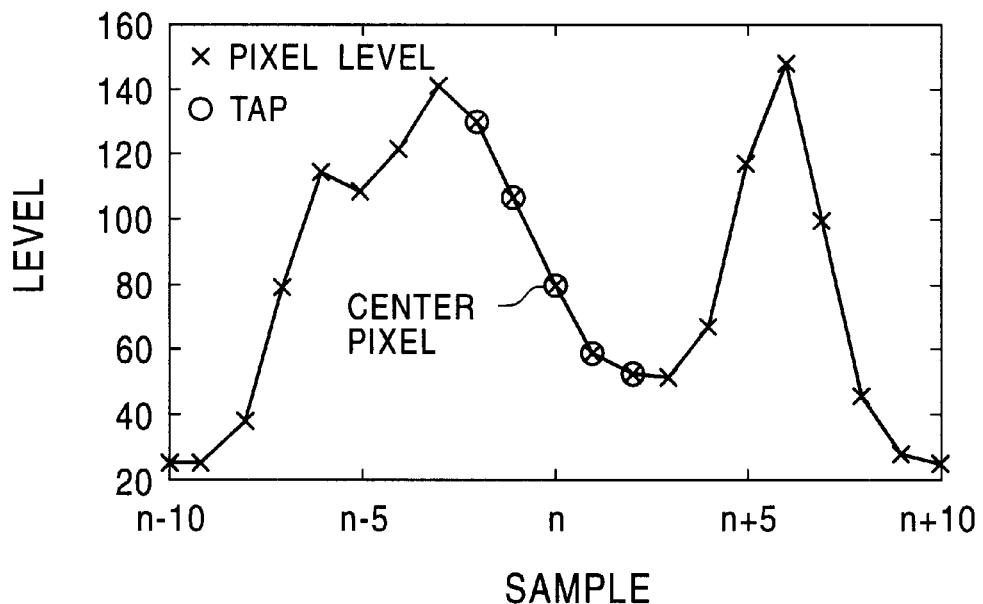
FIG. 18A is a graph showing a tap arrangement initially obtained by the first modification of tap-determining process in step S41 shown in FIG. 16.
Figure 18B:
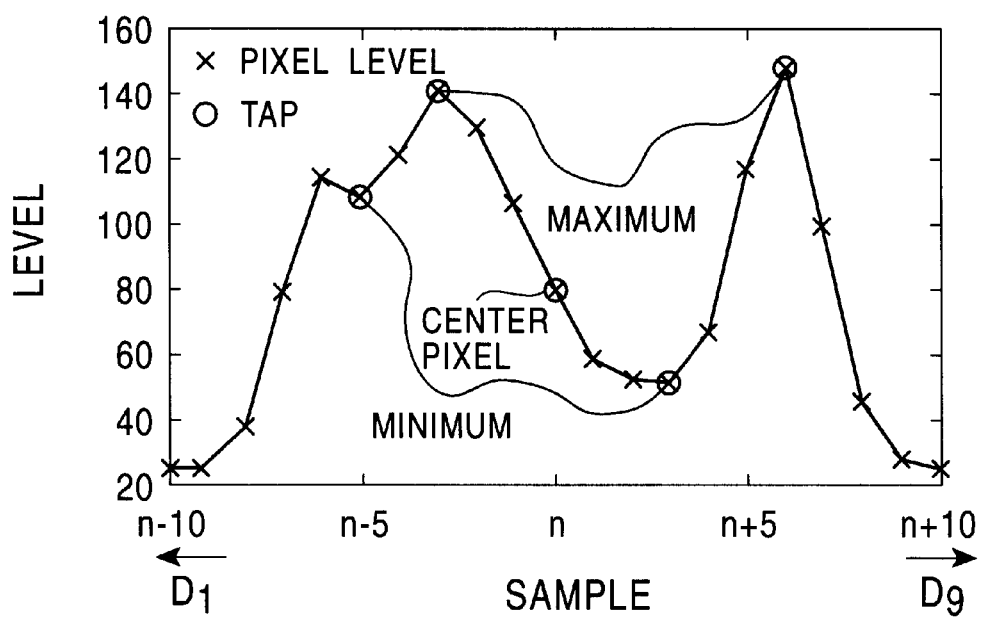
FIG. 18B is a graph showing a tap arrangement as a result of the first modification of the tap-determining process in step S41 shown in FIG. 16.

According to the first embodiment of the above-described tap-determining process, the class-tap generating circuit 2 and the prediction-tap generating circuit 3 generates taps as shown in FIGS. 18A and 18B.

In other words, FIGS. 18A and 18B, FIGS. 20A and 20B, and FIGS. 22A and 22B show the direction $D_1$, to which attention is paid among the sixteen directions shown in FIG. 14, and SD pixels in the direction $D_9$ which is 180-degree opposite to the direction $D_1$.

In FIGS. 18A and 18B, FIGS. 20A and 20B, and FIGS. 22A and 22B, the position of a center pixel for the tap is represented by "n", the position of a pixel which is m pixels (where m is a positive integer) away from the position n in the direction $D_1$ is represented by "n−m", and the position of a pixel which is m pixels away from the position n in the direction $D_9$ is represented by "n+m".

In FIGS. 18A and 18B, FIGS. 20A and 20B, and FIGS. 22A and 22B, each cross symbol indicates (the pixel level) of an SD pixel, and each circular symbol indicates (an SD pixel as) a tap.

FIG. 18A shows basic taps, in which two adjacent SD pixels in the direction $D_1$ with respect to an SD pixel as the center pixel, and two adjacent SD pixels in the direction $D_9$ are used as taps.

Figure 17:
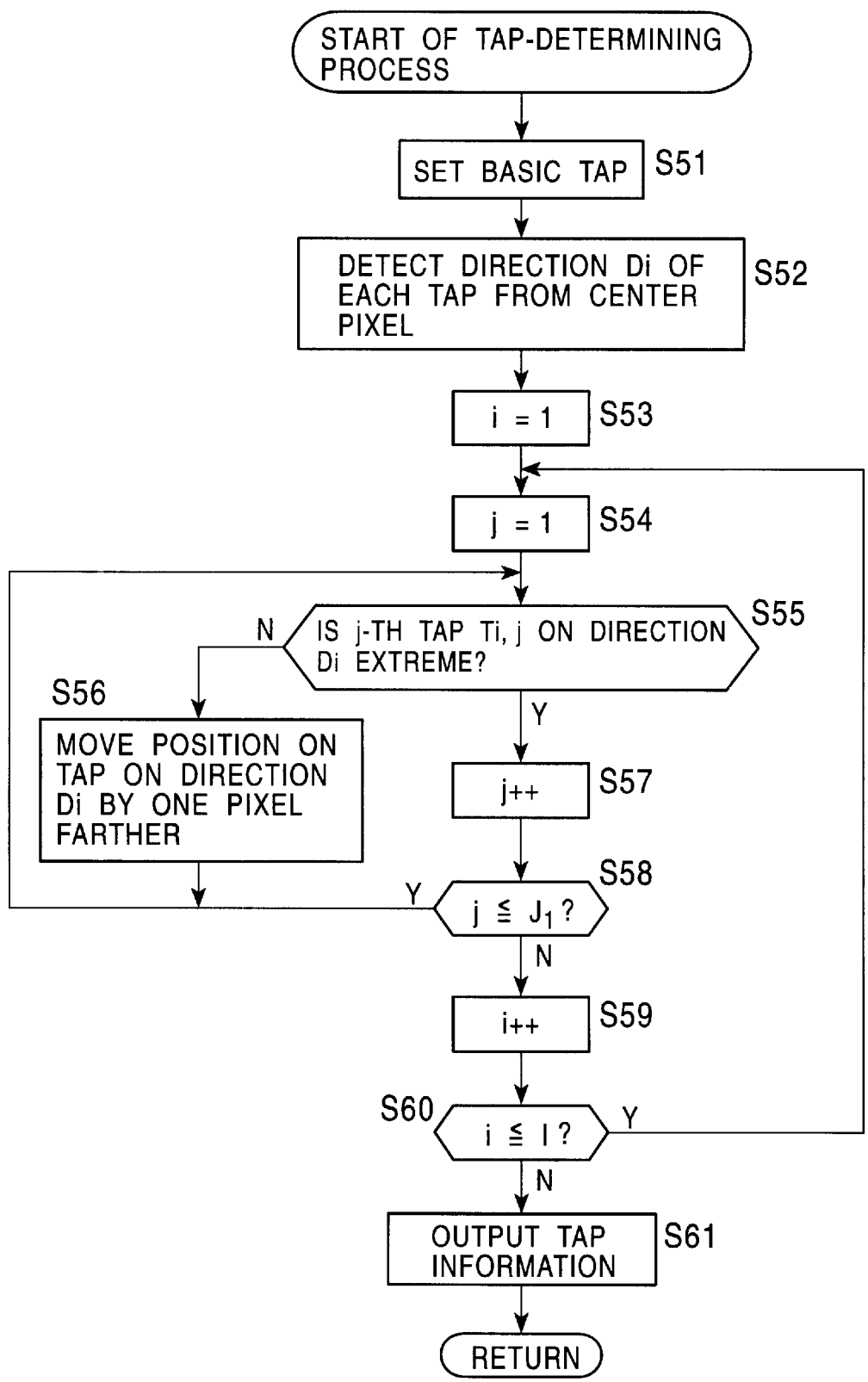
FIG. 17 is a flowchart illustrating a first modification of a tap-determining process in step S41 shown in FIG. 16.

FIG. 18B shows taps generated from the basic taps shown in FIG. 18A by the tap-determining process shown in FIG. 17. In FIG. 18B, with respect to an SD pixel used as the center pixel, an SD pixel having a maximum and an SD pixel having a minimum, which first appear in the direction $D_1$, are used as taps, and an SD pixel having a minimum and an SD pixel having a maximum, which first appear in the direction $D_9$, are used as taps.

With reference to the flowchart shown in FIG. 19, a second modification of the tap-determining process in step S41 (shown in FIG. 16) by the tap-determining circuit 7 is described below.

In steps S71 and S72, the tap-determining circuit 7 performs processing similar to that performed in steps S51 and S52 shown in FIG. 17, thereby setting the basic taps and detecting the sixteen directions $D_1$ to $D_{16}$ to other SD pixels in each basic tap in which the center pixel is used as a start point.

The process proceeds to step S73, the tap-determining circuit 7 initializes a direction-representing variable i detected in step S72 into, for example, "1", and the process proceeds to step S74. In step S74, a dynamic range $DR_i$ of SD pixels in the direction $D_i$ used as taps is computed. In other words, in step S74, the tap-determining circuit 74 detects a maximum and a minimum from among all the SD pixels (including the center pixel) used as taps in the direction $D_i$, and finds the difference between the maximum and the minimum as the dynamic range $DR_i$.

After finding the dynamic range $DR_i$, the tap-determining circuit 7 determines in step S75 whether the dynamic range $DR_i$ is greater than a preset threshold "th". If the tap-determining circuit 7 has determined in step S75 that the dynamic range $DR_i$ is not more than the threshold th, that is, when it is found that the taps in the direction $D_i$ are constant since there is no large change among the SD pixels as the taps in the direction $D_i$, the process proceeds to step S76. In step S76, the SD pixels excluding the center pixel, which constitute the taps, are changed so that intervals among the taps in the direction $D_i$ are increased by one pixel, and the process proceeds to step S74. Subsequently, similar processing is repeatedly performed.

If the tap-determining circuit 7 has determined in step S75 whether the dynamic range $DR_i$ is greater than the threshold th, that is, when it is found that the taps in the direction $D_i$ are not constant since there is a relatively large change among the SD pixels as the taps, the process proceeds to step S77. In step S77, the variable i is incremented by one. The process proceeds to step S78, and the tap-determining circuit 7 determines whether the variable i is not more than the total number I of directions detected in step S72.

If the tap-determining circuit 7 has determined in step S78 that the variable i is not more than the total number I, that is, when SD pixels in which the dynamic range is greater than the threshold th have not been used as tap yet, the process proceeds back to step S74. Subsequently, similar processing is repeatedly performed.

If the tap-determining circuit 7 has determined in step S78 that the variable i is more than the total number I, that is, when SD pixels in which the dynamic range is greater than the threshold th are used as taps in all the directions detected in step S72, the process proceeds to step S79. In step S79, the tap-determining circuit 7 outputs, as tap information, information on the positions of the SD pixels constituting the taps to the class-tap generating circuit 2 and the prediction-tap generating circuit 3, and the process returns.

Figure 20A:
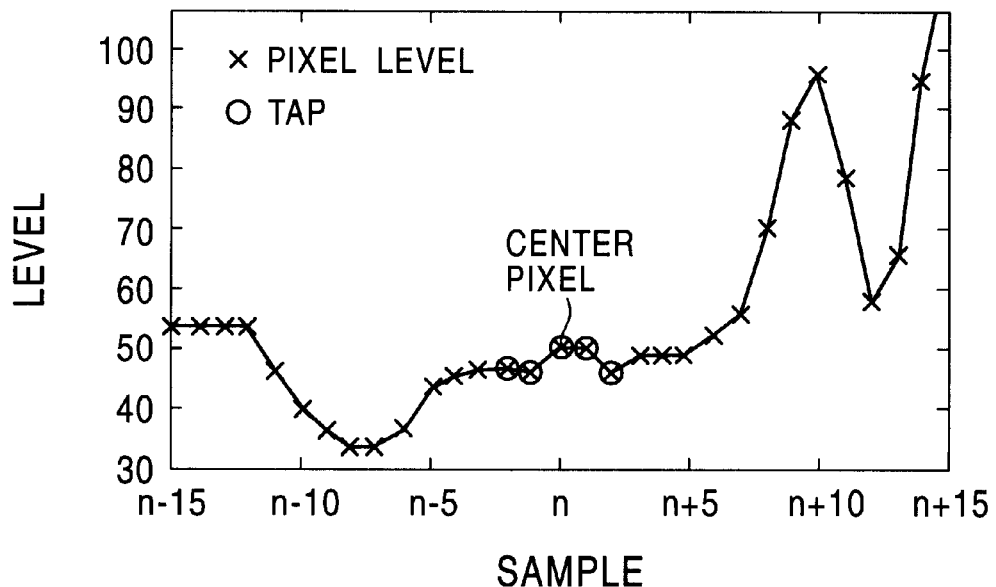
FIG. 20A is a graph showing a tap arrangement initially obtained by the second modification of the tap-determining process in step S41 shown in FIG. 16.
Figure 20B:
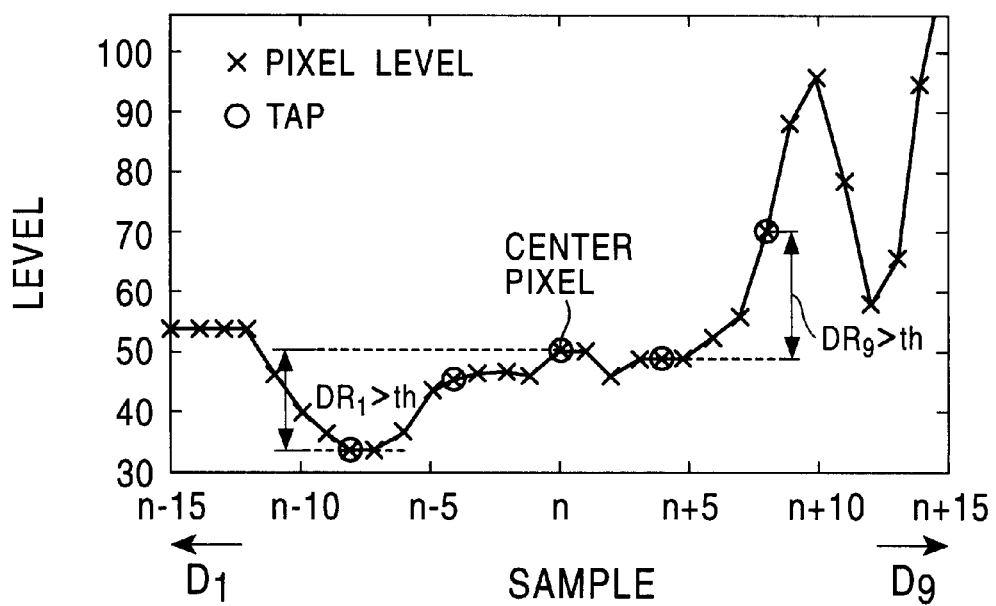
FIG. 20B is a graph showing a tap arrangement as a result of the second modification of the tap-determining process in step S41 shown in FIG. 16.

According to the above-described second modification of the tap-determining process, the class-tap generating circuit 2 and the prediction-tap generating circuit 3 generate, for example, taps as shown in FIGS. 20A and 20B.

FIG. 20A shows basic taps similarly to FIG. 18A, in which, with respect to an SD pixel as the center pixel, two adjacent SD pixels in the direction $D_1$, and two adjacent SD pixels in the direction $D_9$ are used as taps.

Figure 19:
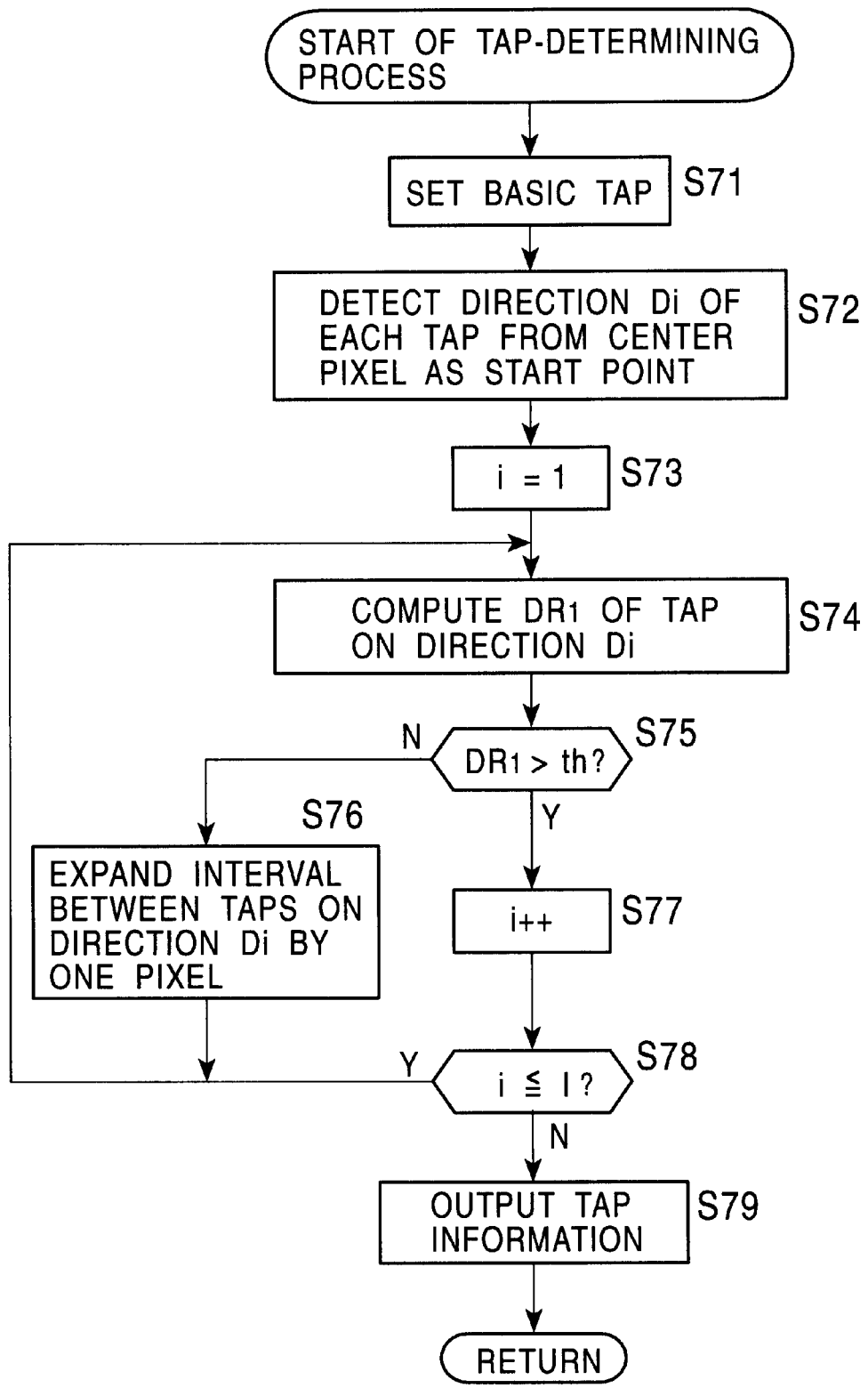
FIG. 19 is a flowchart illustrating a second modification of the tap-determining process in step S41 shown in FIG. 16.

FIG. 20B shows taps generated from the basic taps by the tap-determining process shown in FIG. 19. In all the directions $D_1$ to $D_9$, SD pixels in which the dynamic ranges $DR_1$ to $DR_9$ are greater than the threshold th are used as taps.

In the cases shown in FIG. 19 and FIGS. 20A and 20B, intervals among the SD pixels as the taps are expanded so that the dynamic range $DR_i$, which is the difference between the maximum and the minimum among the SD pixels as the taps in the direction $D_i$, is greater than the threshold th. In addition, by way of example, the intervals among the SD pixels as the taps may be expanded so that the difference between two adjacent SD pixels as the taps in the direction $D_i$ is greater than the threshold th.

With reference to the flowchart shown in FIG. 21, a third modification of the tap-determining process performed in step S41 (shown in FIG. 16) is described below.

In steps S81 to S83, the tap-determining circuit 7 performs processing similar to that performed in steps S51 to S53 shown in FIG. 17. In other words, the tap-determining circuit 7 sets basic taps, detects the sixteen directions $D_1$ to $D_{16}$ to other SD pixels in the basic taps in which the center pixel is used as the a start point, and initializes variable i.

In step S84, the tap-determining circuit 7 finds, for example, a line (hereinafter referred to as also an "approximate line") $L_i$, which is a function approximating (the pixel levels of) SD pixels used as basic taps in the direction $D_i$, and proceeds to step S85. In step S85, the tap-determining circuit 7 finds errors (e.g., squared errors) of the SD pixels (including the center pixel) as the taps in the direction $D_i$ with respect to the approximate line $L_1$, and finds an accumulated value of the errors. In step S86, the tap-determining circuit 7 determines whether the accumulated value of the errors is greater than a predetermined threshold.

If the tap-determining circuit 7 has determined in step S86 that the accumulated value of the errors is not greater than the predetermined threshold, that is, when it is found that the SD pixels as the taps in the direction $D_i$ are constant since there is no particular change among the SD pixels, the tap-determining circuit 7 proceeds to step S87. In step S87, all the taps excluding the center pixel in the direction $D_i$ are moved along the direction $D_i$ (outward) by, for example, one pixel, and proceeds back to step S85. Subsequently, similar processing is repeatedly performed.

If the tap-determining circuit 7 has determined in step S86 that the accumulated value of the errors is greater than the predetermined threshold, that is, when it is found that the SD pixels as the taps in the direction $D_i$ are not constant since there is relatively large change among the SD pixels as the taps, the tap-determining circuit 7 proceeds to step S88, and the variable i is incremented by one. In step S89, the tap-determining circuit 7 determines whether the variable i is not more than the total number I of the directions detected in step S82.

If the tap-determining circuit 7 has determined in step S89 that the variable i is not more than the total number I, that is, when SD pixels in which the accumulated value of the errors is greater than the predetermined threshold value have not yet been used as taps in all the directions detected in step S82, the tap-determining circuit 7 proceeds back to step S84. Subsequently, similar processing is repeatedly performed.

If the tap-determining circuit 7 has determined in step S89 that the variable i is more than the total number I, that is, when the SD pixels in which the accumulated value of the errors is greater than the predetermined threshold value have been used as taps, the tap-determining circuit 7 proceeds to step S90. In step S90, information on the positions of the SD pixels constituting the taps is output as tap information to the class-tap generating circuit 2 and the prediction-tap generating circuit 3, and the process returns.

Figure 22A:
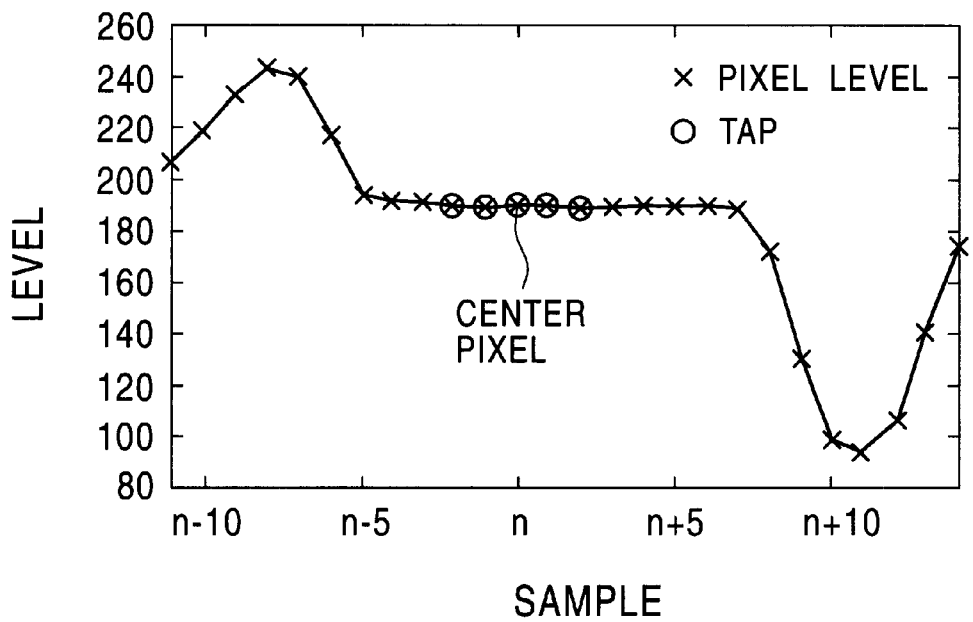
FIG. 22A is a graph showing a tap arrangement initially obtained by the third modification of the tap-determining process in step S41 shown in FIG. 16.
Figure 22B:
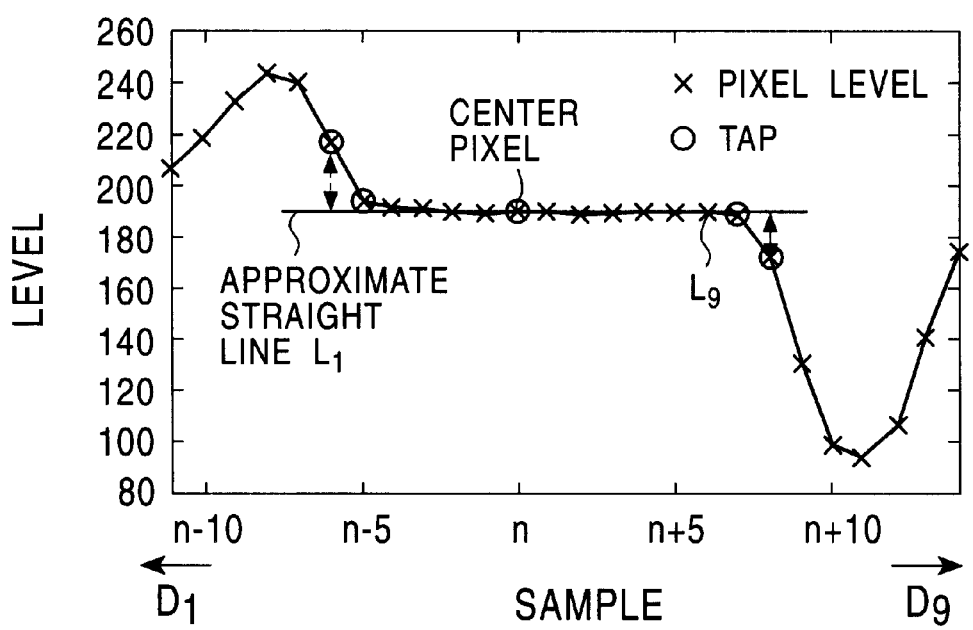
FIG. 22B is a graph showing a tap arrangement as a result of the third modification of the tap-determining process in step S41 shown in FIG. 16.

According to the above-described third modification of the tap-determining process, the class-tap generating circuit 2 and the prediction-tap generating circuit 3 generate taps as shown in FIGS. 22A and 22B.

FIG. 22A shows basic taps similarly to FIG. 18A, in which, with respect to an SD pixel as the center pixel, two adjacent SD pixels in the direction $D_1$, and two adjacent SD pixels in the direction $D_9$ are used as taps.

Figure 21:
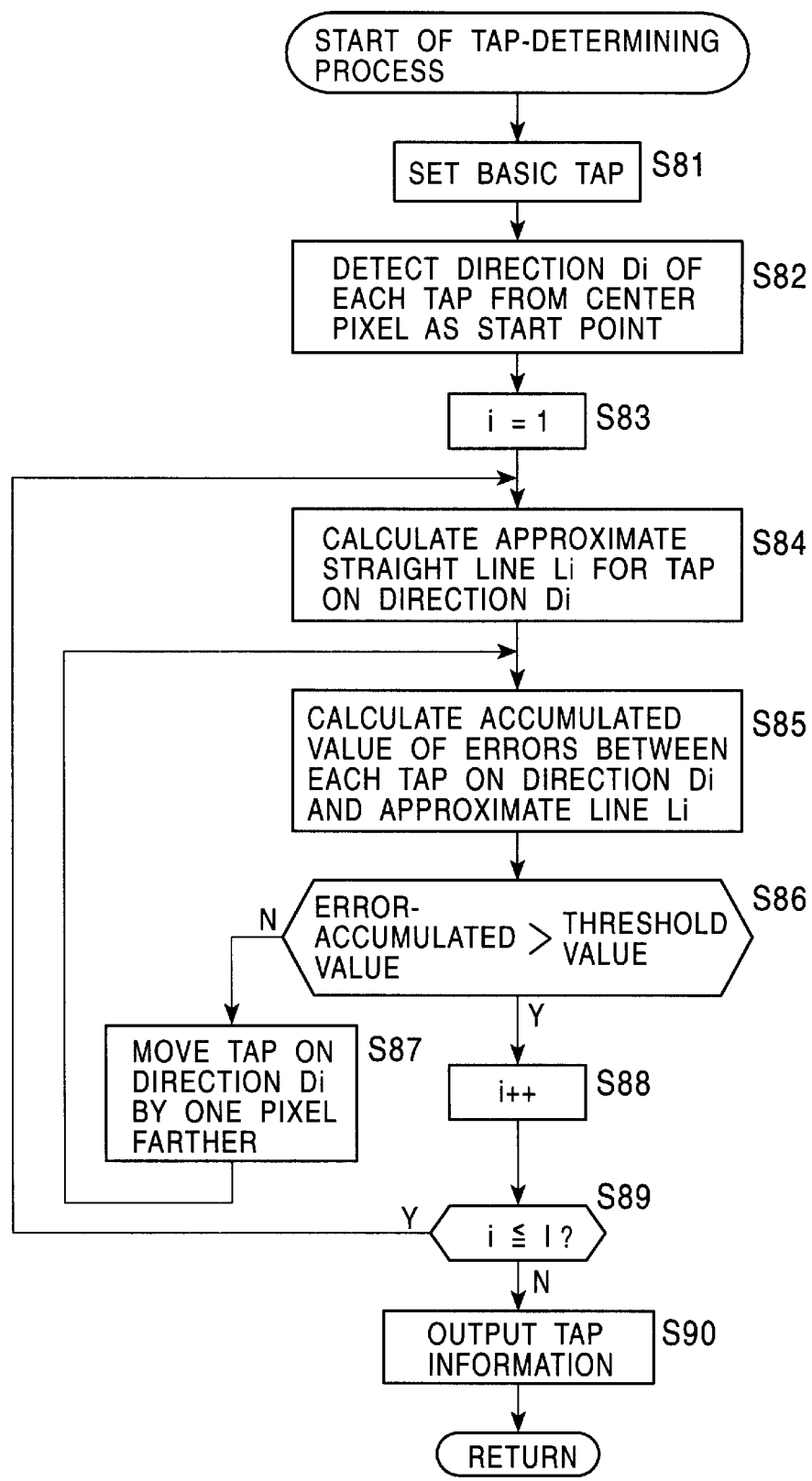
FIG. 21 is a flowchart illustrating a third modification of the tap-determining process in step S41 shown in FIG. 16.

FIG. 22B shows taps generated from the basic taps by the tap-determining process shown in FIG. 21. In all the directions $D_1$ to $D_9$, SD pixels in which an accumulated value of errors from approximate lines $L_1$ to $L_9$ is greater than a predetermined value are used as taps.

In the cases shown in FIG. 21 and FIGS. 22A and 22B, the SD pixels are generated based on the accumulated value of the errors of the SD pixels constituting the taps with respect to the line $L_i$ approximating the SD pixels as the basic taps. In addition, the SD pixels may be generated based on, for example, distribution of the errors.

In the case shown in FIG. 21, in step S87, all the taps excluding the center pixel are moved along the direction $D_i$ by, for example, one pixel. However, the taps may be moved so that each interval among the taps in the direction $D_i$ can be increased by, for example, one pixel.

In the cases shown in FIG. 21 and FIGS. 22A and 22B, a line is found as a function approximating the SD pixels used as the basic taps in the direction $D_i$. In addition, by finding a plane or a curved surface as a function approximating SD pixels as the basic taps, which are positioned in at least two directions, the taps may be determined based on errors with respect to the plane and curved surface.

Figure 23:
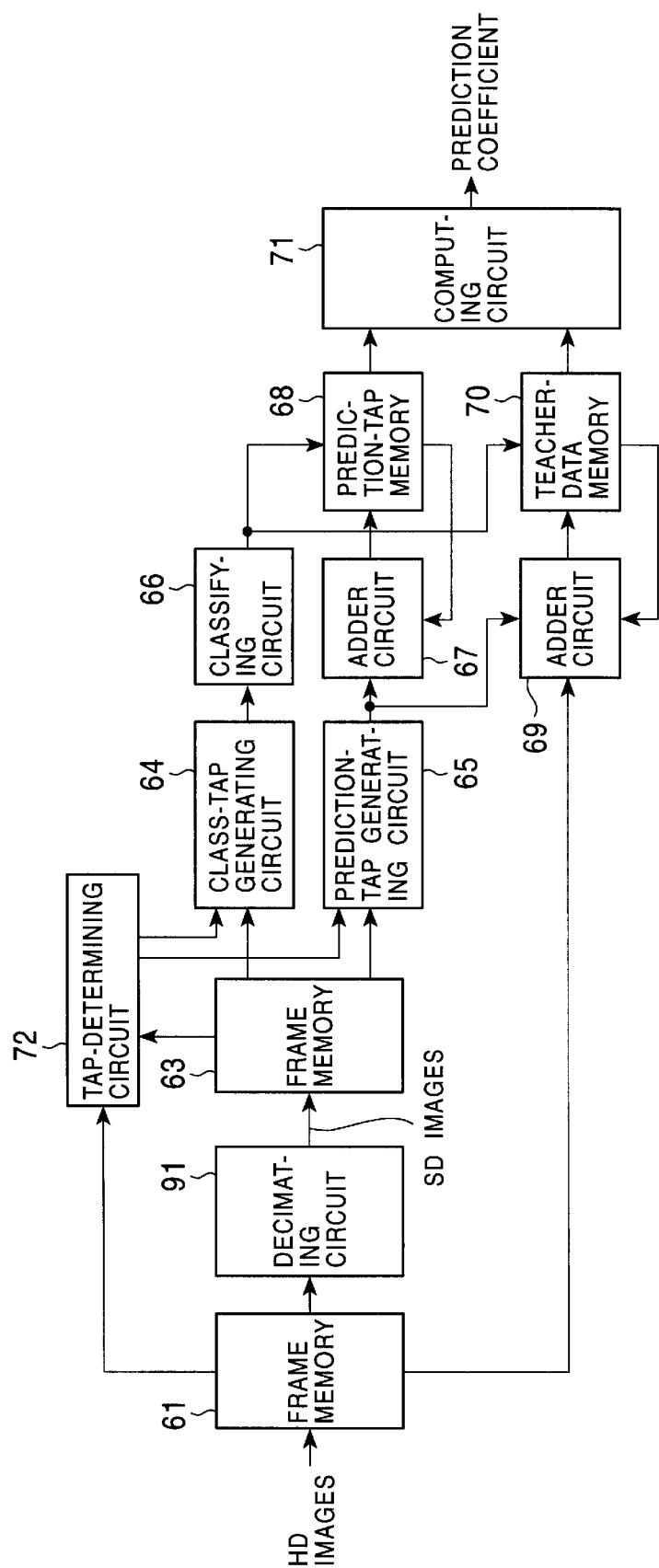
FIG. 23 is a block diagram showing a second embodiment of the learning apparatus of the present invention.

With reference to FIG. 23, a second type of the learning apparatus that finds the prediction coefficients for classes to be stored in the coefficient RAM 5 (shown in FIG. 1) is described below.

The components of the second type, which are identical to those shown in FIG. 7, are denoted by identical reference numerals. Accordingly, the same description is omitted.

Original images (high-resolution HD images), which are used as teacher data y, are supplied to a frame memory 61 in, for example, units of frames, and the frame memory 61 temporarily stores the supplied original images. A decimating circuit 91 read each original image stored in the frame memory 61, which is used as the teacher data y in the learning of prediction coefficients, and decimates pixels constituting the original image, whereby a low-resolution SD image is generated. The decimating circuit 91 generates the SD image (indicated by the circular symbols shown in FIG. 13) by reducing the numbers of horizontal and vertical pixels (indicated by the cross symbols shown in FIG. 13) to half. The SD image is supplied to the frame memory 63.

Figure 24:
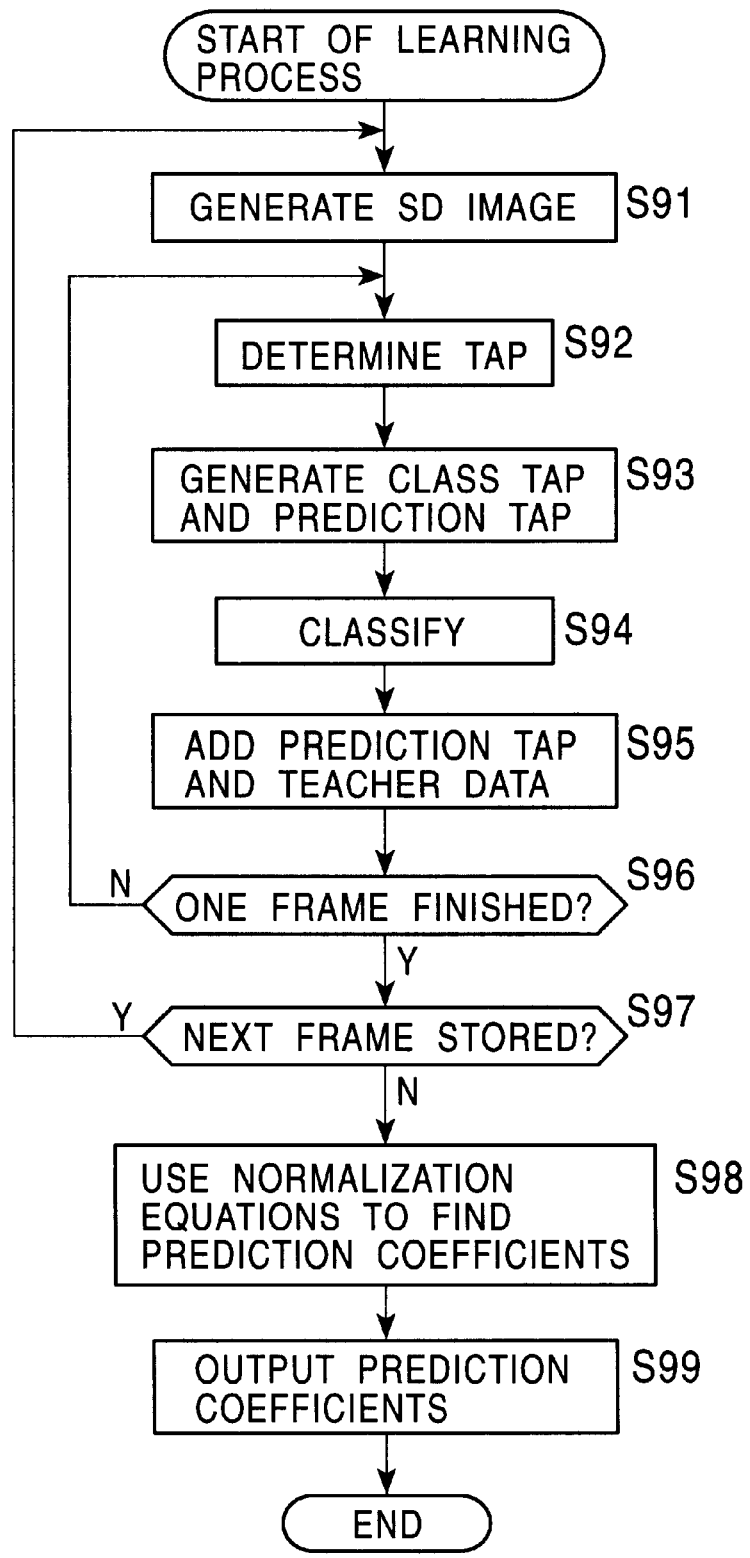
FIG. 24 is a flowchart illustrating a learning process by the learning apparatus shown in FIG. 12.

With reference to the flowchart shown in FIG. 24, a learning process for finding prediction coefficients for classes by the learning apparatus shown in FIG. 23 is described below.

HD images as original images to be used as teacher data are supplied to the learning apparatus in units of frames, and the supplied images are sequentially stored in a frame memory 61. In step S91, the HD image (as original images) stored in the frame memory 61 is supplied to a decimating circuit 91. Each supplied image is converted into an SD image. From the decimating circuit 91, the SD image is supplied and stored as student data in a frame memory 63.

A tap-determining circuit 72 uses, as pixels of interest, predetermined HD pixels in a frame of the SD image stored in the frame memory 63. In step S92, the tap-determining circuit 72 determines SD pixels for generating taps based on the pixel of interests, similarly to the tap-determining circuit 7 shown in FIG. 1. The tap-determining circuit 72 outputs tap information on the SD pixels to a class-tap generating circuit 64 and the a prediction-tap generating circuit 65.

In step S93, the SD pixels for generating class taps and prediction taps based on the pixels of interest are read from the tap-determining circuit 72 in accordance with the tap information from the tap-determining circuit 72, and the class tap and the prediction tap are generated. The class taps are supplied to a classifying circuit 66, and the prediction taps are supplied to adder circuits 67 and 69.

In step S94, the classifying circuit 66 uses the class tap from the class-tap generating circuit 64 to classify the pixels of interest, and supplies class codes, which are the classification results, as addresses to the a prediction-tap memory 68 and a teacher-data memory 70.

In step S95, addition to prediction taps (student data) and teacher data is performed.

In other words, in step S95, the prediction-tap memory 68 reads the stored address corresponding to the class code corresponding to the classifying circuit 66, and supplies the read address to the adder circuit 68. Using the stored values supplied from the prediction-tap memory 68, and the SD pixels for-generating the prediction taps, which are supplied from the prediction-tap generating circuit 65, the adder circuit 67 performs computation corresponding to the summation ($\Sigma$) as a multiplier for the prediction coefficient w in each left side of the normalization equations (7). The adder circuit 67 overwrites the computation result at an address in the prediction-tap memory 68, which corresponds to the class code output by the classifying circuit 66.

Also in step S95, the teacher-data memory 70 reads the stored address corresponding to the class code output from the classifying circuit 66, and supplies the read address to the adder circuit 69. The adder circuit 69 reads the pixels of interest from the frame memory 61, and performs computation corresponding to summation ($\Sigma$) in each right side of the normalization equations (7), using HD pixels used as the read pixels of interest, the prediction taps, and the stored value supplied from the teacher-data memory 70. The adder circuit 69 overwrites the computation result at an address in the teacher-data memory 70, which corresponds to the class code output from the classifying circuit 66.

In step S96, a controller or the like determines whether the above-described processing has been performed using, as pixels of interest, all HD pixels constituting the frame including the pixel of interest. If the controller or the like has determined negatively, the process proceeds back to step S92. Subsequently, similar processing is repeatedly performed using, as new pixels of interest, HD pixels that have not been used as pixels of interest yet.

If the controller or the like has determined in step S96 that the above-described processing has been performed using all the pixels constituting the frame including the pixel of interest, as further pixels of interest, the controller or the like proceeds to step S97, and determines whether the next frame to be processed is stored in the frame memory 61. If the controller or the like has determined in step S97 that the next frame to be processed is stored in the frame memory 61, the process proceeds back to step S91, and similar processing on the next frame to be processed is repeatedly performed.

If the controller or the like has determined in step S97 that the frame to be processed is not stored in the frame memory 61, that is, when the above-described processing has been performed using all the HD images prepared for learning, the process proceeds to step S98. In step S98, a computing circuit 71 sequentially reads values stored at addresses corresponding to the class codes in the prediction-tap memory 68 and the teacher-data memory 70, and solves the normalization equations (7), which use the read values, whereby prediction coefficients for classes are found. In step S99, the computing circuit 71 outputs the prediction coefficients for classes, and the learning process ends.

In the above-described learning process of the prediction coefficients, a class may be generated in which normalization equations required for finding prediction coefficients cannot be obtained. For such a class, default prediction coefficients, or prediction coefficients obtained by predetermined learning with all pixels which are not classified, may be output.

As described above, based on waveform characteristics of SD pixels constituting each tap, SD pixels constituting the tap are determined. Therefore, class taps for performing classification in which properties of pixels are reflected, and prediction taps in which prediction errors in predicted values are reduced, can be generated. As a result, the performance of the classification adaptive processing can be increased.

The above-described processes shown in FIGS. 4, 6, 8, 10, 16, 17, 19, 21, and 24 may be performed by hardware or by software. For using software to perform each process, a program for the software is installed in a computer built into an image processing apparatus and a learning apparatus as dedicated hardware, or a various types of program are installed in a multi-purpose computer that performs various types of processes.

Figure 25A:
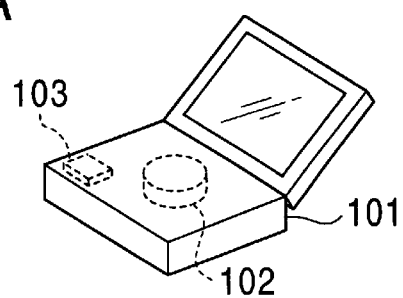
FIG. 25A is an illustration of a computer 101 into which a program for executing processing according to the present invention is installed.
Figure 25B:
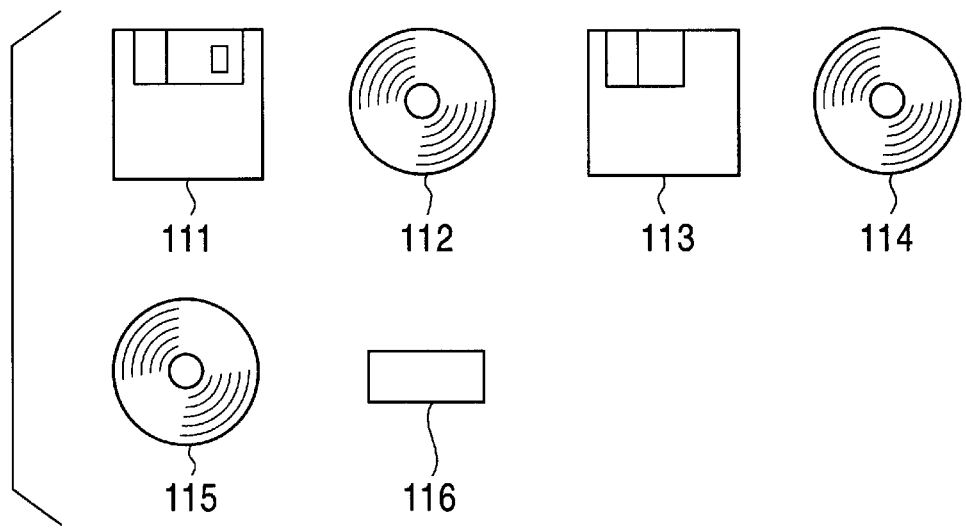
FIG. 25B is an illustration of types of a recording medium for storing a program for executing processing according to the present invention.
Figure 25C:
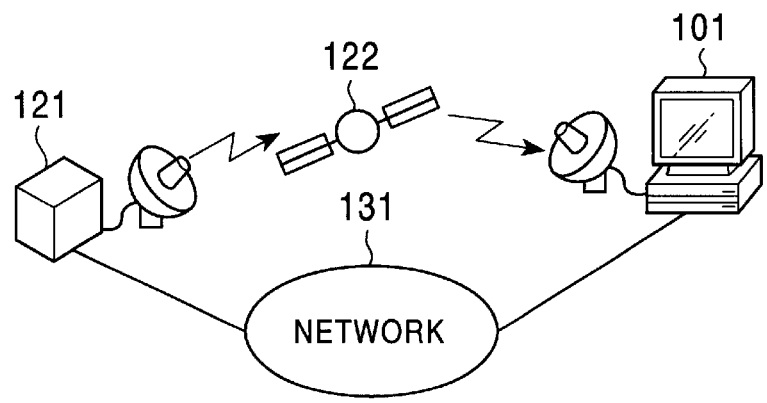
FIG. 25C is a concept illustration of distribution of a program for executing processing according to the present invention to a computer via a satellite or a network.

With reference to FIGS. 25A, 25B, and 25C, a medium used when the programs for executing each of the above-described processes is installed in a computer beforehand so as to be executed by th e computer are described below.

The program can be provided to a user in the form that it is installed in a hard disk (indicated by "HDD" in FIGS. 25A and 26) 102 or a semiconductor memory 103 as a recording medium built into a computer 101, as shown in FIG. 25A.

Also, by temporarily or permanently storing the program in a recording medium such as a floppy disk 111, a compact-disk read-only memory (CD-ROM) 112, a magneto-optical (MO) disk 113, a digital versatile disk (DVD) 114, a magnetic disk 115, or a semiconductor memory 116, the program can be provided as package software, as shown in FIG. 25B.

In addition, as shown in FIG. 25C, by using radio communication to transfer the program from a download site 121 to a computer 101 via a digital broadcasting satellite 122, or transferring, by wire, the program via a network 131 such as the Internet, the program can be stored in the hard disk 102 built into the computer 101.

The "medium" in this specification means a broad concept including all the above-described types of medium.

In this specification, the steps that describe the program provided by the medium does not need to be time-sequentially executed in accordance with the order indicated by each flowchart, but include processes (e.g., parallel processing or object-oriented processing) executed in parallel or separately.

With reference to FIG. 26, the structure of the computer 101 shown in FIGS. 25A to 25C is described below.

The computer 101 includes a central processing unit (CPU) 142, as shown in FIG. 26. An input/output (I/O) interface 145 is connected to the CPU 142 via a bus 141. When a user inputs a command to the CPU 142 by operating an input unit 147 including a keyboard and a mouse, the CPU 142 executes, in accordance with the command, a program stored in a read-only memory (ROM) corresponding to the semiconductor memory 103. The CPU 142 loads, into a random access memory 144, a program stored in the hard disk 102, a program installed in the hard disk 102 after being transferred from the satellite 122 or the network 133 and being received by a communication unit 148, a program installed in the hard disk 102 after being read from the floppy disk 111, the CD-ROM 112, the MO disk 113, the DVD 114, or the magnetic disk 115, which is loaded into a drive 149. The CPU 142 executes the loaded program, and outputs the execution result to a display unit 146 including a liquid crystal display via, for example, the I/O interface 145, as required.

Since the classification adaptive processing uses teacher data and student data to perform learning for prediction coefficients corresponding to classes, and finds predicted values of the teacher data from input data by performing linear prediction using the prediction coefficients and the input data, prediction coefficients for the desired predicted values can be obtained depending on teacher data and student data for use in learning. By way of example, by using, as teacher data, an image including no noise, and using, as student data, an image generated by adding noise to the image as teacher data, prediction coefficients for deleting the noise can be obtained. Accordingly, the present invention can be applied not only to the above-described case in which resolution is increased by reducing blurring, but also to cases in which noise is eliminated and in which waveform is changed.

In the foregoing embodiments, a moving picture is processed by the classification adaptive processing. However, in addition to the moving picture, a still image, a sound, a signal read from a recording medium, etc., can be processed.

In the foregoing embodiments, class taps and prediction taps are generated in accordance with the same tap information, and both types of taps are formed by the same pixels. However, the class taps and the prediction taps can be generated so as to have different structures, in other words, the class taps and the prediction taps may be generated in accordance with different types of tap information.

In the foregoing embodiments, both class taps and prediction taps are generated in accordance with tap information, using SD pixels variably positioned to each pixel of interest. However, either type of taps may be generated using SD pixels fixedly positioned to each pixel of interest.

In the second embodiment, SD pixels constituting taps are determined based on whether the SD pixels constituting the taps are extreme, the dynamic range, an error from an approximate line, etc. However, based on characteristics (waveform characteristics) of SD pixels in waveform, SD pixels constituting the taps may be determined.

In the second embodiment, SD pixels constituting taps are determined for directions from a center pixel as a start point. However, the SD pixels constituting taps may not be always determined for the directions.

In the foregoing embodiments, an image processing apparatus and a learning apparatus for use in the image processing apparatus are separately provided. However, the image processing apparatus and the learning apparatus may be integrally provided. In this case, learning can be performed in real time by the learning apparatus, and prediction coefficients for use in the image processing apparatus can be updated in real time.

In the second embodiment, prediction coefficients for classes are prestored in the coefficient RAM 5. However, the prediction coefficients may be supplied to the image processing apparatus, with, for example, input images (SD image).

Class taps and prediction taps may be generated using either spatially positioned pixels and temporally positioned pixels.

In the learning process, addition corresponding to summation ($\Sigma$) in the expressions (7) is performed using prediction taps. Addition with prediction taps formed by SD pixels having different positions from each pixel of interest is performed using corresponding pixels in the prediction taps.

In other words, when a basic tap is formed using 25 pixels composed of five horizontal pixels x five vertical pixels from a center pixel, a prediction tap is formed using arbitrary pixels in the sixteen directions $D_1$ to $D_{16}$ shown in FIG. 14. Thus, a prediction tap and another prediction tap are formed with pixels having different positions from the center pixel. In this case, a pixel as the first tap from the center pixel in the direction $D_1$ in a prediction tap, is added to a pixel as the first tap from the center pixel in the direction $D_{16}$ in another prediction tap.

Also the classification is performed in the same aspect. In other words, when (the pixel level of) each pixel as a tap in each direction which constitutes a class tap is equal to each pixel as a tap in the corresponding order from the center pixel in the corresponding direction, classification results based on the two class taps coincide with each other (are classified into the same class).

What is claimed is:

1. A data processing apparatus for predicting output data corresponding to input data by processing said input data, comprising:

determining means capable of determining, in accordance with a plurality of data to be extracted from said input data, irregular intervals among said plurality of data to be extracted from said input data;

extracting means for extracting the plurality of data corresponding to output data of interest to be predicted from said input data in accordance with the determination result by said determining means; and predicting means for finding predicted values of the output data of interest based on the plurality of data extracted by said extracting means.

2. A data processing apparatus according to claim 1, wherein said determining means determines said plurality of data to be extracted from said input data so that a statistical value based on the plurality of data is approximately a predetermined value.

3. A data processing apparatus according to claim 2, wherein said determining means determines said plurality of data to be extracted from said input data so that standard deviations based on the extracted data are approximately a predetermined value.

4. A data processing apparatus according to claim 3, wherein said determining means determines the plurality of data to be extracted from said predetermined block based on the average of the standard deviations of said plurality of data to be extracted from said input data, which are located in a predetermined block of said input data.

5. A data processing apparatus according to claim 2, further comprising storage means for storing said predetermined value.

6. A data processing apparatus according to claim 1, further comprising classifying means for classifying the output data of interest based on the extracted data and for outputting corresponding class codes, wherein said predicting means predicts the output data of interest by using prediction coefficients corresponding to the class codes.

7. A data processing apparatus according to claim 6, wherein said predicting means uses said prediction coefficients and the extracted data to perform linear prediction of the output data of interest.

8. A data processing apparatus according to claim 6, further comprising prediction-coefficient storage means for storing said prediction coefficients corresponding to the class codes.

9. A data processing apparatus according to claim 1, wherein said input data and the output data are image data.

10. A data processing apparatus according to claim 9, wherein said extracting means extracts, from said input data as said image data, pixels which are temporally and spatially adjacent to the output data of interest as said image data.

11. A data processing apparatus according to claim 9, wherein:

said input data are image data having different degrees of blurring; and said determining means determines said plurality of data to be extracted from said input data for the respective image data having different degrees of blurring.

12. A data processing apparatus according to claim 9, wherein:

said input data are image data having different resolutions; and said determining means determines said plurality of data to be extracted from said input data for the respective image data having different resolutions.

13. A data processing apparatus according to claim 9, wherein said determining means determines a width used for decimating a plurality of pixels as said plurality of data to be extracted from said input data as said image data so that a statistical value based on the pixels is approximately a predetermined value.

14. A data processing apparatus according to claim 1, wherein said determining means determines said plurality of data to be extracted from said input data based on waveform characteristics of said plurality of data to be extracted from said input data.

15. A data processing apparatus according to claim 14, wherein said determining means detects an extreme value of said input data, and determines, based on the detection result, said plurality of data to be extracted from said input data.

16. A data processing apparatus according to claim 14, wherein said determining means calculates a difference among said input data, and determines, based on the calculation result, said plurality of data extracted from said input data.

17. A data processing apparatus according to claim 14, wherein said determining means computes an error of said input data from a function approximating said input data, and determines, based on the computation result, said plurality of data to be extracted from said input data.

18. Learning apparatus for predicting output data corresponding to input data by processing said input data, comprising:

determining means capable of determining, in accordance with a plurality of data to be extracted from said input data, irregular intervals among said plurality of data to be extracted from said input data; and extracting means for extracting the plurality of data corresponding to output data of interest to be predicted from said input data in accordance with the determination result; and computing means for finding prediction coefficients based on the extracted data.

19. A learning apparatus according to claim 18, wherein said determining means determines the plurality of data extracted from said input data so that a statistical value of the plurality of data is approximately a predetermined value.

20. A learning apparatus according to claim 19, wherein said determining means determines the plurality of data extracted from said input data so that standard deviations based on the plurality of data extracted from said input data is approximately a predetermined value.

21. A learning apparatus according to claim 20, wherein said determining means determines the plurality of data extracted from said input data based on the average of the standard deviations based on the plurality of data extracted from said input data.

22. A learning apparatus according to claim 19, further comprising storage means for storing said predetermined value.

23. A learning apparatus according to claim 22, wherein said extracting means extracts, from said input data as said image data, pixels which are temporally and spatially adjacent to the output data of interest as said image data.

24. A learning apparatus according to claim 19, further comprising predetermined-value computing means for computing said predetermined value.

25. A learning apparatus according to claim 24, wherein said predetermined-value computing means uses the prediction coefficients for classes which correspond to the plurality of data to find, as said predetermined value, a statistical value of the plurality of data, which is obtained when results of processing said input data approach said output data.

26. A learning apparatus according to claim 18, further comprising classifying means for outputting class codes corresponding to output data of interest by classifying said output data of interest based on the plurality of data extracted from said extracting means, said computing means finding the prediction coefficients corresponding to the class codes.

27. A learning apparatus according to claim 18, wherein said computing means finds prediction coefficients enabling prediction of the output data of interest by linear prediction using the plurality of data.

28. A learning apparatus according to claim 18, wherein said input data and the output data are image data.

29. A learning apparatus according to claim 28, wherein:
said input data are image data having different degrees of blurring; and
said determining means determines, for the respective image data having different degrees of blurring, the plurality of data extracted from said input data.

30. A learning apparatus according to claim 28, wherein:
said input data have different resolutions; and
said determining means determines, for the respective image data having different degrees of blurring, the plurality of data extracted from said input data.

31. A learning apparatus according to claim 27, wherein said determining means determines a width for decimating a plurality of pixels extracted from said input data as said image data so that a statistical value based on the extracted pixels is approximately a predetermined value.

32. A learning apparatus according to claim 27, wherein said determining means determines irregular intervals among a plurality of pixels extracted from said input data as said image data so that a statistical value based on the extracted pixels is approximately a predetermined value.

33. A learning apparatus according to claim 18, wherein said determining means determines the plurality of data extracted from said input data in accordance with waveform characteristics of the extracted data.

34. A learning apparatus according to claim 33, wherein said determining means calculates a difference among said input data, and determines, based on the calculation result, the plurality of data extracted from said input data.

35. A learning apparatus according to claim 33, wherein said determining means computes an error of said input data from a function approximating said input data, and determines, based on the computation result, the plurality of data extracted from said input data.

36. A learning apparatus according to claim 33, wherein said determining means detects an extreme value of said input data, and determines, based on the detection result, the plurality of data extracted from said input data.

37. A data processing method for predicting output data corresponding to input data by processing said input data, said data processing method comprising the steps of:
enabling determination of irregular intervals among a plurality of data to be extracted from said input data in accordance with said plurality of data to be extracted;
extracting the plurality of data corresponding to output data of interest to be predicted from said input data in accordance with the determination result; and
finding predicted values of the output data of interest based on the extracted plurality of data.

38. A learning method for predicting output data corresponding to input data by processing said input data, said learning method comprising the steps of:
enabling determination of irregular intervals among a plurality of data to be extracted from said input data in accordance with said plurality of data to be extracted;
extracting the plurality of data corresponding to output data of interest to be predicted from said input data in accordance with the determination result; and
finding prediction coefficients based on the extracted plurality of data.

39. A storage medium containing a computer-controllable program for predicting output data corresponding to input data by processing said input data, said computer-controllable program comprising the steps of:
enabling determination of irregular intervals among a plurality of data to be extracted from said input data in accordance with said plurality of data to be extracted;
extracting the plurality of data corresponding to output data of interest to be predicted from said input data in accordance with the determination result; and
finding predicted values of the output data of interest based on the extracted plurality of data.

40. A storage medium containing a computer-controllable program for predicting output data corresponding to input data by processing said input data, said computer-controllable program comprising the steps of:
enabling determination of irregular intervals among a plurality of data to be extracted from said input data in accordance with said plurality of data to be extracted;
extracting the plurality of data corresponding to output data of interest to be predicted from said input data in accordance with the determination result; and
finding prediction coefficients based on the extracted plurality of data.

* * * * *